(12) United States Patent
Stokes

(10) Patent No.: US 11,785,049 B2
(45) Date of Patent: Oct. 10, 2023

(54) METHODS AND SYSTEMS FOR NETWORK SECURITY AND PRIVACY PROTECTION

(71) Applicant: ACTION STREAMER, LLC, Cincinnati, OH (US)

(72) Inventor: Richard Stokes, Glenview, IL (US)

(73) Assignee: ACTION STREAMER, LLC, Cincinnati, OH (US)

( * ) Notice: Subject to any disclaimer, the term of this patent is extended or adjusted under 35 U.S.C. 154(b) by 0 days.

(21) Appl. No.: 17/463,739

(22) Filed: Sep. 1, 2021

(65) Prior Publication Data
US 2021/0400085 A1   Dec. 23, 2021

Related U.S. Application Data

(63) Continuation-in-part of application No. 17/012,644, filed on Sep. 4, 2020, now abandoned, and a continuation-in-part of application No. 17/012,466, filed on Sep. 4, 2020, now abandoned, and a continuation-in-part of application No. 17/012,349,
(Continued)

(51) Int. Cl.
    *H04L 9/40*   (2022.01)
(52) U.S. Cl.
    CPC .......... *H04L 63/20* (2013.01); *H04L 63/0236* (2013.01); *H04L 63/1425* (2013.01); *H04L 63/1458* (2013.01)
(58) Field of Classification Search
    CPC . H04L 63/20; H04L 63/0236; H04L 63/1425; H04L 63/1458; H04L 63/0442
    See application file for complete search history.

(56) References Cited

U.S. PATENT DOCUMENTS

| 6,038,601 A | 3/2000 | Lambert et al. |
| 8,856,869 B1 * | 10/2014 | Brinskelle ............. H04L 63/166 726/2 |

(Continued)

FOREIGN PATENT DOCUMENTS

| EP | 2068264 A2 * | 6/2009 | ............. G06F 21/33 |

OTHER PUBLICATIONS

Moscicki et al. English translation of CN 105723376 A. (Year: 2014).*

(Continued)

*Primary Examiner* — John M Macilwinen
(74) *Attorney, Agent, or Firm* — Panitch Schwarze Belisario & Nadel LLP

(57) ABSTRACT

Exemplary embodiments provide for rate limiting access to data endpoints which includes a processor configured to monitor network traffic between one or more devices on a first network and a second network. The processor may receive a first data endpoint request from one of the one or more devices and compare the first data endpoint request to a ledger of one or more data endpoints. The ledger may have a rate limit associated with the one or more data endpoints which defines a threshold number of requests allowed for the one or more data endpoints. In response to the first data endpoint request matching one or more of the data endpoints on the ledger, the processor may block the first data endpoint request when the data endpoint request exceeds the threshold number of requests allowed for the matching data endpoint on the ledger.

15 Claims, 18 Drawing Sheets

Related U.S. Application Data filed on Sep. 4, 2020, now abandoned, and a continuation-in-part of application No. 17/012,503, filed on Sep. 4, 2020, now abandoned.

(60) Provisional application No. 62/896,624, filed on Sep. 6, 2019, provisional application No. 62/896,641, filed on Sep. 6, 2019, provisional application No. 62/896,632, filed on Sep. 6, 2019, provisional application No. 62/896,616, filed on Sep. 6, 2019.

(56) References Cited

U.S. PATENT DOCUMENTS

| | | | |
|---|---|---|---|
| 10,440,042 B1* | 10/2019 | Stein | H04L 69/22 |
| 11,075,923 B1* | 7/2021 | Srinivasan | H04L 67/61 |
| 2007/0136579 A1 | 6/2007 | Levy et al. | |
| 2010/0131668 A1* | 5/2010 | Kamath | H04L 47/32 |
| | | | 709/233 |
| 2011/0173071 A1 | 7/2011 | Meyer et al. | |
| 2012/0117267 A1* | 5/2012 | Holloway | G06Q 10/107 |
| | | | 709/233 |
| 2017/0099314 A1* | 4/2017 | Klatt | H04L 63/1483 |
| 2017/0134430 A1* | 5/2017 | Feng | H04L 63/1425 |
| 2017/0251013 A1* | 8/2017 | Kirti | H04L 63/1441 |
| 2017/0359447 A1 | 12/2017 | Chan et al. | |
| 2018/0048567 A1 | 2/2018 | Ignatchenko | |
| 2019/0036930 A1 | 1/2019 | Bartik et al. | |
| 2019/0045026 A1 | 2/2019 | Sekharan | |
| 2019/0364072 A1* | 11/2019 | Purusothaman | H04L 63/0263 |
| 2021/0075817 A1* | 3/2021 | Stokes | H04L 63/1433 |
| 2021/0126922 A1* | 4/2021 | Stokes | G06F 21/6227 |
| 2021/0367923 A1* | 11/2021 | Kaidi | H04L 63/0263 |

OTHER PUBLICATIONS

Phung, Phu H., David Sands, and Andrey Chudnov. "Lightweight self-protecting JavaScript." Proceedings of the 4th International Symposium on Information, Computer, and Communications Security. (Year: 2009).*

Varadharajan, Vijay, et al. "A policy-based security architecture for software-defined networks." IEEE Transactions on Information Forensics and Security 14.4: 897-912. (Year: 2018).*

Office Action in U.S. Appl. No. 17/012,466, dated Apr. 1, 2021.

* cited by examiner

METHODS AND SYSTEMS FOR NETWORK SECURITY AND PRIVACY PROTECTION

FIELD

The present disclosure relates to the improvement of privacy and security capabilities of networks and computing devices.

BACKGROUND

With the increasing number of computing networks and computing devices, including smart devices, internet of things devices, etc., network security is more important than ever. As such, there is always a need for privacy and security policies, methods for enabling such policies, increased network security, and other capabilities that are more robust so that the security and usage of computing networks and networked computing devices can be improved. Currently, one common method of user privacy involves blocking specific endpoints (e.g. domains such as doubleclick.net, etc.) that are known to exist primarily for the purpose of tracking and/or serving advertising to users. However, this method has several disadvantages, namely, companies have begun to purposefully conflate the use of designated endpoints to both track users and to activate intended functionality on a user device, website, or application. For example, certain mobile applications currently require access to the doubleclick.com domain, which serves advertising and tracking scripts to a large number of websites. If a user were to block the doubleclick.net domain on their device, they would break the functionality of the mobile applications that require it.

Further, such proliferation of computing devices used by consumers has led to a vast amount of user data which companies have begun to monetize. One well-known method of identifying individual users include the use of tracking cookies; however, tracking cookies are increasingly being blocked by users, browsers, extensions, and other privacy hardware and software. In response, privacy adversaries (e.g. Internet Service Providers, websites, and advertisement technology companies) are increasingly relying on anti-fingerprinting techniques to identify users. Anti-fingerprinting techniques rely on probing browsers, e.g. with a JavaScript file, for device specific characteristics such as screen resolution, graphics card vendors, installed fonts, etc., which provide a unique profile for individual users. Currently, a common method of user privacy involves blocking these anti-fingerprinting techniques by blocking certain, or all, JavaScript functions. However, this method has several disadvantages, namely, blocking JavaScript functions often results in the loss of website functionality and/or breaking websites completely.

Currently, web browsers typically host each web page into a distinct in-memory process, which isolates web pages from one another and effectively prevents cross-process attacks. Further, current software-based web extensions are hosted in the browser and these extensions typically host a large in-memory database consisting of blocklists, allow lists and other rules which are dynamically applied to web pages as they are loaded for the purpose of blocking ads or enhancing user privacy. However, current web extensions are often subject to browser-specific limitations on what data can be shared between tabs (processes). This results in redundant processing and storage needs, high memory usage and slower performance. Additionally, proposed changes to browser API implementations are expected to eliminate the ability of browser extensions to maintain persistent state.

Thus, there is a need for a novel solution for 1) improving user privacy protection without affecting the operability of certain devices, websites, and applications, etc., 2) enabling web filtering for the purpose of privacy protection and/or ad blocking within browsers that do not otherwise permit it, and 3) improving browser performance in browsers that do permit such web filtering.

SUMMARY

A method for rate limiting access to data endpoints is disclosed, the method comprising: monitoring network traffic between one or more devices on a first network and a second network; receiving a first data endpoint request from one of the one or more devices; comparing the first data endpoint request to a ledger of one or more data endpoints, the ledger having a rate limit associated with the one or more data endpoints, the rate limit defining a threshold number of requests allowed for the one or more data endpoints; and in response to the first data endpoint request matching one or more of the data endpoints on the ledger: comparing the first data endpoint request to the rate limit associated with the matching data endpoint on the ledger; and blocking the first data endpoint request if the data endpoint request exceeds the threshold number of requests allowed for the matching data endpoint on the ledger.

A system for rate limiting access to data endpoints is disclosed, the system comprising: a processor and a non-transitory computer-readable storage device, wherein instructions stored on the storage device cause the processor to be configured to: monitor network traffic between one or more devices on a first network and a second network; receive a first data endpoint request from one of the one or more devices; compare the first data endpoint request to a ledger of one or more data endpoints, the ledger having a rate limit associated with the one or more data endpoints, the rate limit defining a threshold number of requests allowed for the one or more data endpoints; and in response to the first data endpoint request matching one or more of the data endpoints on the ledger: compare the first data endpoint request to the rate limit associated with the matching data endpoint on the ledger; and block the first data endpoint request when the data endpoint request exceeds the threshold number of requests allowed for the matching data endpoint on the ledger.

A computer program product for rate limiting access to data endpoints is disclosed, the computer program product comprising: a non-transitory computer-readable storage medium having program instructions stored thereon, the program instructions executable by a computer and cause the computer to be configured to: monitor network traffic between one or more devices on a first network and a second network: receive a first data endpoint request from one of the one or more devices; compare the first data endpoint request to a ledger of one or more data endpoints, the ledger having a rate limit associated with the one or more data endpoints, the rate limit defining a threshold number of requests allowed for the one or more data endpoints; and in response to the first data endpoint request matching one or more of the data endpoints on the ledger: compare the first data endpoint request to the rate limit associated with the matching data endpoint on the ledger; and block the first data endpoint request if the data endpoint request exceeds the threshold number of requests allowed for the matching data endpoint on the ledger.

A method for rate limiting of JavaScript functions is disclosed, the method comprising: monitoring network traffic between one or more devices on a first network and a second network; receiving a domain request from one of the one or more devices; receiving a JavaScript function request from the domain of the domain request; comparing the JavaScript function request to a ledger, the ledger having a rate limit associated with one or more JavaScript functions for a plurality of domains, the rate limit defining a threshold number of JavaScript functions requests allowed for each of the plurality of domains in a period of time; and in response to the domain matching one of the plurality of domains on the ledger compare the domain request to the rate limit associated with the matching domain of the plurality of domains on the ledger; determine the rate limit associated with the domain for the JavaScript function request has been exceeded; log the JavaScript function request in the ledger; and block the JavaScript function request.

A system for rate limiting of JavaScript functions is disclosed, the system comprising: a processor and a non-transitory computer-readable storage device, wherein instructions stored on the storage device causing the processor to be configured to: monitor network traffic between one or more devices on a first network and a second network; receive a domain request from one of the one or more devices; receive a JavaScript function request from the domain of the domain request; compare the JavaScript function request to a ledger, the ledger having a rate limit associated with one or more JavaScript functions for a plurality of domains, the rate limit defining a threshold number of JavaScript functions requests allowed for each of the plurality of domains in a period of time; and in response to the domain matching one of the plurality of domains on the ledger: compare the domain request to the rate limit associated with the matching domain of the plurality of domains on the ledger; determine the rate limit associated with the domain for the JavaScript function request has been exceeded; log the JavaScript function request in the ledger; and block the JavaScript function request.

A computer program product for rate limiting of JavaScript functions is disclosed, the computer program product comprising: a computer-readable storage medium having program instructions embodied therewith, the program instructions executable by a computer to cause the computer to be configured to: monitor network traffic between one or more devices on a first network and a second network; receive a domain request from one of the one or more devices; receive a JavaScript function request from the domain of the domain request; compare the JavaScript function request to a ledger, the ledger having a rate limit associated with one or more JavaScript functions for a plurality of domains, the rate limit defining a threshold number of JavaScript functions requests allowed for each of the plurality of domains in a period of time; and in response to the domain matching one of the plurality of domains on the ledger: compare the domain request to the rate limit associated with the matching domain of the plurality of domains on the ledger; determine the rate limit associated with the domain for the JavaScript function request has been exceeded; log the JavaScript function request in the ledger; and block the JavaScript function request.

A method for filtering domain requests is disclosed, the method comprising: transmitting, by a web extension, a polling request to a specified endpoint, the specified endpoint being enforced by a network monitoring device in a first network; receiving, by the web extension, a payload from the specified endpoint, the payload including at least a unique network device identifier of the network monitoring device; receiving, by the web extension, a domain request from a browser application executing on a user device in a second network; generating, by the web extension, a call to the network monitoring device based on the domain request to the specified endpoint received from the client device; receiving, by the web extension, a response to the request from the network monitoring device; and filtering, by the web extension, the domain request based on the response from the network monitoring device.

A system for filtering domain requests is disclosed, the system comprising: at least one processor and at least one non-transitory computer-readable storage device, wherein instructions stored on the at least one storage device configuring the at least one processor to: transmit a polling request to a specified endpoint, the specified endpoint being enforced by a network monitoring device in a first network; receive a payload from the specified endpoint, the payload including at least a unique network device identifier of the monitoring device; receive a domain request from browser application executing on a user device in a second network; generate a call to the monitoring device based on the domain request to the specified endpoint received from the client device; receive a response to the request from the monitoring device; and filter the domain request based on the response from the monitoring device.

A computer program product for filtering domain requests is disclosed, the computer program product comprising: a non-transitory computer-readable storage medium having program instructions embodied therewith, the program instructions executable by a computer and configure the computer to: transmit a polling request to a specified endpoint, the specified endpoint being enforced by a network monitoring device on the first network; receive a payload from the specified endpoint, the payload including at least a unique network device identifier of the network monitoring device; receive a domain request from browser application executing on a user device in a second network; generate a call to the monitoring device based on the domain request to the specified endpoint received from the client device; receive a response to the request from the network monitoring device; and filter the domain request based on the response from the network monitoring device.

A method for privacy and security policy delivery is disclosed, the method comprising: storing, in a memory device of a computing device, activity data associated with a plurality of domains on a first network; monitoring, by the computing device, a stream of packets addressed to a destination endpoint on the first network, the stream of packets originating from a device on a second network; analyzing, by the computing device, the stream of packets to identify a first domain associated with the destination endpoint and a second domain associated with the originating device; comparing, by the computing device, the first and second domains with the activity data stored in the memory device; determining, by the computing device, a security risk of the first and second domains to a user of the originating device; and enforcing, by the computing device, security policies for the first and second domains based on the determined security risks for each domain.

A system for privacy and security policy delivery is disclosed, the system comprising: at least one processor and at least one storage device connected to the at least one processor, the at least one storage device storing instructions, which causes the at least one processor to be configured to: store, in a memory of a computing device, activity data associated with a plurality of domains on a first network; monitor, by the computing device, a stream of packets addressed to a destination endpoint on the first network, the stream of packets originating from a device on a second network; analyze, by the computing device, the stream of packets to identify a first domain associated with the destination endpoint and a second domain associated with the originating device; compare, by the computing device, the first and second domains with the activity data stored in the memory device; determine, by the computing device, a security risk of the first and second domains to a user of the originating device; and enforce, by the computing device, security policies for the first and second domains based on the determined security risks for each domain.

A computer program product for privacy and security policy delivery is disclosed, the computer program product comprising: a computer-readable storage medium having program instructions stored thereon, the program instructions executable by a computer to cause the computer to: store, in a memory device of a computing device, activity data associated with a plurality of domains on a first network; monitor, by the computing device, a stream of packets addressed to a destination endpoint on the first network, the stream of packets originating from a device on a second network; analyze, by the computing device, the stream of packets to identify a first domain associated with the destination endpoint and a second domain associated with the originating device; compare, by the computing device, the first and second domains with the activity data stored in the memory device; determine, by the computing device, a security risk of the first and second domains to a user of the originating device; and enforce, by the computing device, security policies for the first and second domains based on the determined security risks for each domain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
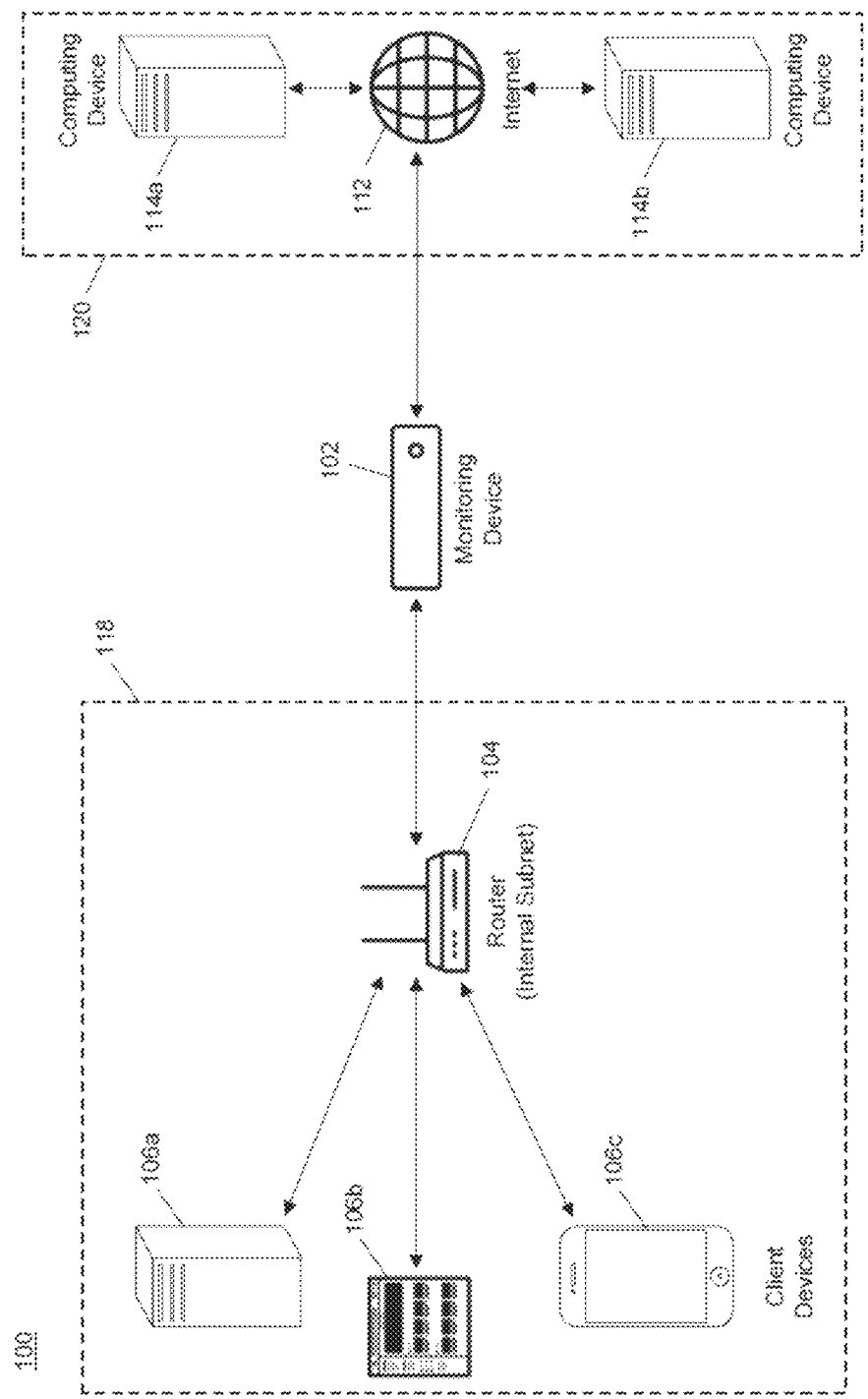
FIG. 1 is a block diagram illustrating high level system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

The present disclosure provides a novel solution for rate limiting device access to data endpoints with potential privacy risk. The terms "data endpoint(s)," "endpoint(s)" and "domain(s)" are used herein interchangeably to refer to a domain and any endpoints associated with that domain (e.g. domain hosting servers). Traditional approaches for limiting device access to data endpoints with potential privacy risk include completely blocking, e.g. using network-wide blocklists, certain domains, e.g. doubleclick.net, known to have a privacy risk. However, the traditional approach of blocking certain domains with a privacy risk has several disadvantages, namely, unintentionally breaking the functionality of certain devices, websites, and applications, etc. which require access to those domains. Therefore, users have to continually intervene to allow these endpoints in order to restore the functionality of the device, website, and/or application, etc., which is inconvenient to the user and exposes the user to significant risk of revealing their entire browser history. The methods, systems, and computer program products disclosed herein provide a novel solution, not addressed by current technology, for limiting access to certain data endpoints known to have a privacy risk. In exemplary embodiments of the methods, systems, and computer program products provided for herein, a monitoring device may permit occasional access, e.g. granting time limited access, to certain domains associated with a privacy risk; therefore permitting certain devices, websites, and applications, etc. to function properly while also curtailing exposure on the network as a whole. Further, the methods, systems, and computer program products provided for herein limit access to specific endpoints when triggered by previously identified related domains by blocking access to the specific endpoint unless it is absolutely required for a specific device, website, or application, etc. to function properly. Thus, the methods, systems, and computer program products herein provide a novel solution for rate limiting access to data endpoints with potential privacy risk.

Further, exemplary embodiments of the present disclosure address the issues in performance caused by web extensions by integrating a web extension with a separate hardware device. In addition, the disclosed embodiments enable web filtering for the purpose of privacy protection and/or ad blocking even within browsers that do not otherwise permit it. Browser performance is improved by offloading expensive web filtering processes to a network device which has been configured and tuned specifically for performing web-filtering operations. As a result, RAM and CPU utilization on the client device is reduced. According to exemplary embodiments of the present disclosure, the network owner can set privacy policies for all users, rather than relying on users to set their own policies.

System for Browsing Detection and Device Identification

FIG. 1 illustrates a system 100 for monitoring communication between network components for first and third party detection, identifying communication sources, and rate limiting device access to data endpoints with potential privacy risk in accordance with exemplary embodiments.

The system 100 may include a monitoring device 102. The monitoring device 102, discussed in more detail below, may be a specialized computing device that is specially configured to perform the functions discussed herein for identifying first and third party devices and domains, occluding TLS communications, and identifying source devices and communications based on TLS data packet information. Further, the monitoring device 102 may be specially configured with filtering application program interfaces (APIs), which it uses to make web filtering decisions based on information received from a web extension. It will be apparent to persons having skill in the relevant art that the monitoring device 102 may be part of another device, such as a router (e.g. the router 104) or endpoint device (e.g. the client devices 106 or computing devices 114, etc.), or may be a standalone device, such as illustrated in FIG. 1.

The system 100 may also include a router 104 or other gateway computing device, and one or more client devices 106. Client devices 106 may be any type of computing device or program executed thereby that is an endpoint for communications in a communication network, such as a desktop computer 106a, web browsing application program 106b, smart phone 106c, or any other suitable type of computing device as desired. The router 104 and client devices 106 may be part of a first network 118. The system 100 may also include a second network 120, which may include a large network of computing devices 114, which may be the Internet 112 or other large network of devices. The computing devices 114 may include web servers, content servers, endpoint devices, routers, etc. The router 104 may be used as a connection between the first network 118 and the second network 120, where the monitoring device 102 inspects and monitors data that passes between the two networks. The monitoring device 102 can be considered to be a part of the first network 118 and/or the second network 120. According to an exemplary embodiment, the monitoring device 102 may include the functionality of the router 104 as configured to perform the functions of the monitoring device 102 as discussed herein.

As discussed in more detail below, the monitoring device 102 may be configured to monitor communications from the Internet 112 (e.g. the second network 120) to the first network 118. Such monitoring may be used to identify first and third parties in the system 100 and the domains and devices associated therewith. The monitoring device 102 may also be configured to occlude network device TLS signatures in the system 100. For instance, the monitoring device 102 may, with permission of a client device 106, intercept communications destined for the client device 106 and may purport itself as the client device 106 for the sake of the TLS communication and act on behalf thereof. The use of monitoring and TLS occlusion may enable the monitoring device 102 to determine if data requests and packets sent to the first network 118 are safe, genuine, and not malicious, and may protect the router 104 and client devices 106 from the receipt of unauthorized data requests and protect the data stored therein and the integrity of the first network 118. The monitoring and classifying of data requests and source computing devices 114 may also enable users of the first network 118, such as a network operator, to determine the health and security of the network and make decisions to allow communications from computing devices 114 and/or second networks 120. As a result, the monitoring device 102 may automatically improve network health and security, as well as providing beneficial tools to users for even greater increases in network security and operations.

A traditional approach for monitoring network traffic includes explicitly marking any requests as a first-party request which does not contain a referring uniform resource locator (URL). This approach is used by certain browser extensions. While this approach may handle the cases where a user enters a URL directly into their browser or an Internet of things device initiates a request on its own behalf, in the common event that a user clicked a link from a search engine, the destination site would incorrectly be marked as third-party, when in fact the user intended to navigate to that site. The present disclosure differs from such incorrect marking, because the monitoring device 102 does not treat the site as a third-party simply because the request originated from another site, but rather determines the site is a first party based on subsequent behavior, as described herein. Another case in which traditional approaches fails is with certain third-party tracking requests, which intentionally block their own referring URL through the use of nested scripts to avoid detection. The difference is that tracking scripts need to run very quickly and be relatively unnoticeable. As a result, the scripts universally load just a few requests (1-3 is common) and thus fail to exceed the threshold. If they were to load many requests, it would introduce noticeable delays. The present disclosure exploits this behavior in selectively filtering these out.

Another traditional approach is to consider as first party requests any requests in which the two strings match. This approach may identify websites visited via a search engine because those websites may send many requests to their own domain. In an example, a user may click a link on a search engine to navigate to the nytimes.com website. Resources loaded by the New York Times from its own domain (e.g., nytimes.com) are correctly marked as first party while other domains (e.g., jx-sec.indexww.com) are marked as third party. However, this traditional approach would fail to match self-initiated requests via a user's browser or other applications or many requests made from non-standard browsing software (such as Internet of Things (IoT) devices) because referrer URLs are not provided in such cases. This approach would also fail to identify third-party tracking scripts which call themselves through nested tracking scripts and do not obscure their referring URL. Consider the example in which a tracking script served by indexww.com calls another resource from its own servers. In this case, the traditional implementation fails and the second request is incorrectly marked as first party. This resource will thus be served with a less stringent security policy.

Finally, the traditional approach would incorrectly mark requests made to affiliated resources served from the same root domain third-party websites as third-party, such as content hosting sites or other servers which are commonly used to host videos and other large files because the referring strings do not have an exact match, such as where the string may be from "static.nytimes.com" instead of simply "nytimes.com."

Exemplary embodiments of the present disclosure require a minimal amount of information and incur minimal computational overhead for all requests, thus making the present disclosure a viable method for environments in which minimizing latency is desirable. This reduction in overhead is due to the utilization of a short-lived burst filter (the second memory cache, discussed below) which maintains a data structure consisting of the domains which have been very recently visited. This conservative data retention policy results in very fast lookups. The present disclosure can also deduce a user's intended web destination and treat resources required by that destination more favorably, while distinguishing them from third-party tracking sources that are called by the same website. These tracking programs can more aggressively filter while preserving the intended functionality of the intended destination site. As an example, the present system may modify the expiration date of a tracking cookie from five years to 24 hours or less, thus allowing the site to function as intended while mitigating the surveillance potential of the cookie. In contrast, web browsers and other traditional software typically only offer users the ability to block all third-party requests and/or cookies, which frequently breaks intended site functionality.

Consider by way of example that modern browsers allow users to delete or block all third-party cookies. This, however, can have an adverse effect on web browsing due to logging users out of single sign-on services and other content sharing services such as video sites. By correctly distinguishing third-party sites, the present disclosure is able to selectively reduce the expiration time of cookies to a few hours (or even a few minutes), and allow the sites to function correctly while minimizing their ability to track users over longer periods of time. The present disclosure thus effectively eliminates the ability of third parties to make use of any collected user data.

The monitoring device 102 may be configured to identify client devices and applications by using data included in data packets that are sent as part of a TLS handshake process. In such cases, the monitoring device 102 may intercept data packets, such as CLIENTHELLO packets, that are transmitted to the first network 118 as part of a TLS handshake. The monitoring device 102 may build a data string for the packet that includes version information of the TLS protocol being used, where additional information appended to the data string is data that remains after the use of filters, such as for filtering cipher suites, supported curves, and supported points. Commonly used cipher suites, curves, and points may be filtered using data lists stored in the monitoring device 102, which may be available as part of communication standards, ongoing practices of the monitoring device 102, and/or available from authorized service providers, etc. As data is filtered from the data packet, remaining data may be appended to the data string, where, in some cases, delimiters may be used to separate such additions. In some cases, flags may also be appended to the data string, such as to indicate compression methods, if stapling is used, and/or if TLS tickets are supported, etc.

The data string may be hashed once the data string is built. The resulting hash value can then be used as a signature value. That signature value may serve as a unique identifier for the source computing device 114 or application program of the CLIENTHELLO packet. This signature value may be used later to identify other packets and communications from the same device, which may simplify and improve the routing and monitoring processes of the monitoring device 102 and thereby improve other functionality of the monitoring device 102 and the first network 118.

Monitoring Device

Figure 2:
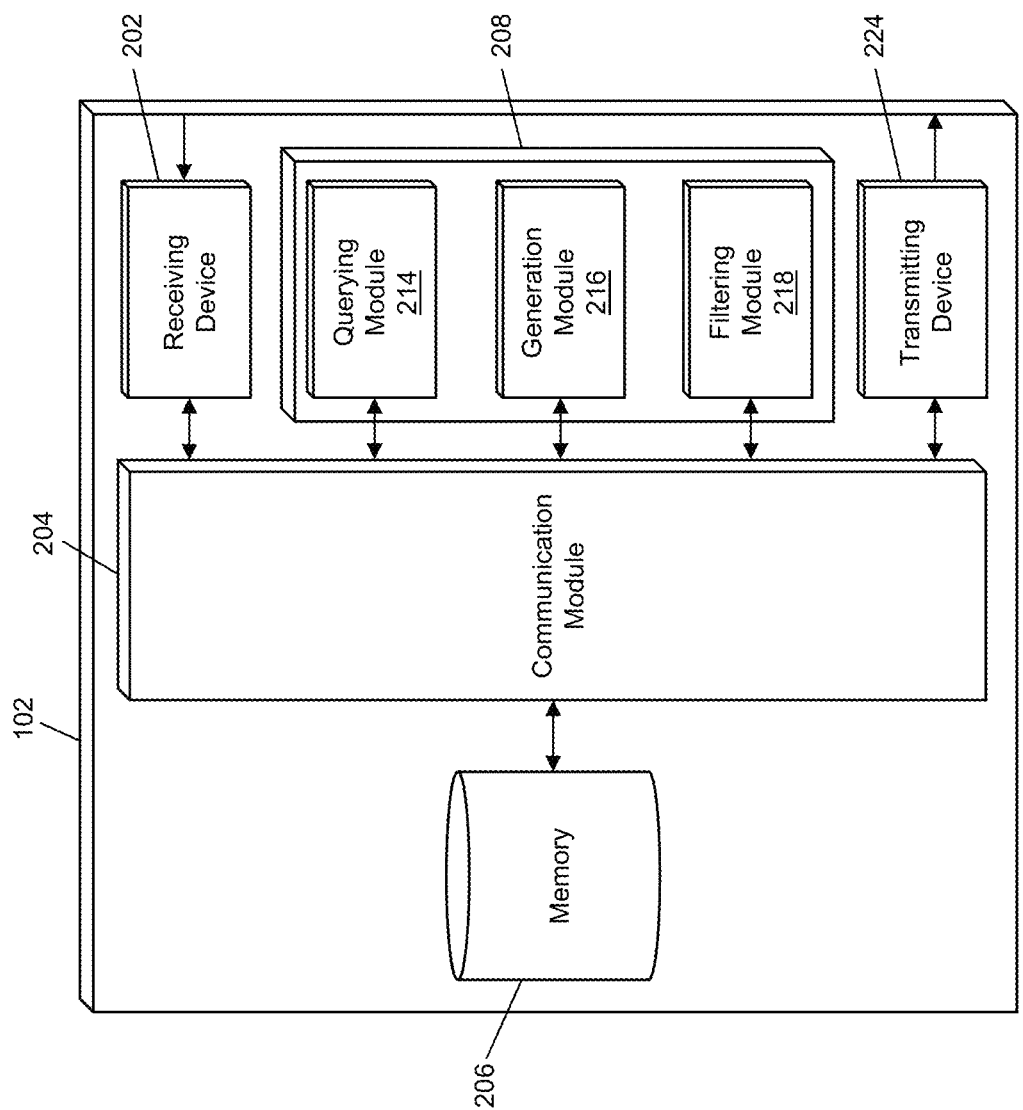
FIG. 2 is a block diagram illustrating a monitoring device in the system 100 in accordance with exemplary embodiments.

FIG. 2 illustrates an embodiment of the monitoring device 102 in the system 100. It will be apparent to persons having skill in the relevant art that the embodiment of the monitoring device 102 illustrated in FIG. 2 is provided as illustration only and may not be exhaustive to all possible configurations of the monitoring device 102 suitable for performing the functions as discussed herein. For example, the computer system 1200 illustrated in FIG. 12 and discussed in more detail below may be a suitable configuration of the monitoring device 102. In some cases, routers 104, client devices 106, computing devices 114, or other devices may be configured to have the components of the monitoring device 102 as illustrated in FIG. 2 and discussed below, such as in instances where such a device may also perform the functions of the monitoring device 102. For example, a router 104 may be configured to also serve as a monitoring device 102 for the first network 118. The monitoring device 102 can be located either on the same subnet as the users' computer (e.g., a client device 106) or outside of the gateway or router 104 of the client device 106. According to some aspects, the monitoring device 102 can access the stream of network packets emanating from a client device 106 and thus should be logically located between the client device 106 and an external second network 120. One such configuration consists of locating the monitoring device 102 downstream of a router 104 or other upstream device, where it can intercept communications to and from the Internet 112. In some embodiments, multiple subnets and/or routers 104 can be connected to and/or communicate with the monitoring device 102. For example, the monitoring device 102 may include two or more LAN ports (or other modules), where each port can connect to a subnet.

The monitoring device 102 may include a receiving device 202. The receiving device 202 may be configured to receive data over one or more networks via one or more network protocols. In some instances, the receiving device 202 may be configured to receive data from the client devices 106, the router 104, the computing devices 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network (e.g. the first network 118) and a second receiving device for receiving data via the Internet (e.g. the second network 120). The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the monitoring device 102 and to carry out the methods and systems described herein.

The receiving device 202 may be configured to receive data signals electronically transmitted by computing devices 114, routers 104, client devices 106, and other devices that are being transmitted to or from the first network 118. Such data signals may be superimposed or otherwise encoded with any type of data, such as TLS data packets, data requests, etc., and may originate from first or third party domains and devices. The receiving device 202 may also be configured to receive data signals that are superimposed or otherwise encoded with updated filtering lists, such as may be provided by a user (e.g., via an input device) or from a backend server, that may be used to provide updated data, firmware, etc., for the monitoring device 102. The receiving device 202 may also be configured to receive data requests destined for or transmitted by a client device 106, such as the web browsing application program 106b. For instance, a request for a website or other resource (e.g., hypertext markup language, cascading style sheets, images, scripts, etc.) may be received by the receiving device 202 from the client device 106, where, in return, the receiving device 202 may receive the requested resources from a web server (e.g. the computing devices 114). Such resources may include tracking images and other information, such as internet protocol addresses, browser information, cookies, referring resource locators, etc. According to an exemplary embodiment, the client device 106 can include a web extension which interacts and filters web pages as they are loaded on a client device, such as through a web request API. The web extension maintains a minimal state and its cache can be unloaded at any time by the browser within which it is resident without loss of functionality. The receiving device 202 can be connected to receive data communicated by the web extension in real time.

The monitoring device 102 may also include a communication module 204. The communication module 204 may be configured to transmit data between modules, engines, databases, memories, and other components of the monitoring device 102 for use in performing the functions discussed herein. The communication module 204 may be configured according to one or more communication types. The communication module 204 may also utilize various communication methods for communications within a computing device. For example, the communication module 204 may be comprised of a bus, contact pin connectors, wires, etc. In some embodiments, the communication module 204 may also be configured to communicate between internal components of the monitoring device 102 and external components of the monitoring device 102, such as externally connected databases, display devices, and input devices, etc.

The monitoring device 102 may also include a processing device 208. The processing device 208 may be configured to perform the functions of the monitoring device 102 discussed herein as will be apparent to persons having skill in the relevant art. In some embodiments, the processing device 208 may include and/or be comprised of a plurality of engines and/or modules specially configured to perform one or more functions of the processing device 208, such as a querying module 214, a generation module 216, and a filtering module 218, etc. As used herein, the term "module" may be software or hardware particularly programmed to receive an input, perform one or more processes using the input, and generate an output. The input, output, and processes performed by various modules will be apparent to one skilled in the art based upon the present disclosure.

The monitoring device 102 may also include a memory 206. The memory 206 may be configured to store data for use by the monitoring device 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device 208, and other data that may be suitable for use by the monitoring device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, and accessing, etc. of structured data sets stored therein. The memory 206 may be configured to store, for example, cryptographic keys, salts, nonces, and communication information for the back-end system, etc. According to an exemplary embodiment, the memory 206 can be configured to store filtering APIs such as domain block lists, domain allow lists, cookie stores, fingerprint parameters, Uniform Resource Locator (URL) filters, and Request Logs among other suitable APIs for performing the operations and methods described herein as desired.

The memory 206 may be configured to store filtering data for use in filtering information from data packets received as part of TLS handshakes. Filtering data may include lists of cipher suites, supported curves, supported points, and other data that may be filtered out of a data packet for inclusion of remaining data in a data string built for device and application identification. The memory 206 may also store domain lists and counters related thereto, as well as other information for use in domain sorting and classification, as discussed below. The memory 206 may also be configured to store data based on transmissions to and from the client devices 106 in the first network 118. For instance, the memory 206 may store collections of personally identifiable information and web activity, which may be collected and stored by various commercial entities for the purpose of de-anonymizing individuals, constructing personal profiles including their web activity, demographics, psychographics and behavior, and enabling the end users' browsing history to be reconstructed (partially or entirety). This data collection and profiling may occur without the end users' knowledge or explicit consent. The information may be used commercially against the user, such as by charging higher prices to certain users with higher ability to pay, affecting credit scores, and/or influencing insurance underwriting, etc., which can have the potential to cause societal or legal harm (such as in the case of mass surveillance) or direct harm (such as by hackers and eavesdroppers). In some embodiments, the user may intend to visit certain websites either directly or indirectly via links but is generally unaware that the user may be requesting and providing resources to other websites and entities which may be engaging in tracking and personal profiling. The websites which users knowingly and intentionally visit may be referred to as first parties or first party websites/domains while other websites which the user may not be aware of and are collecting information about their activity are referred to as third parties or third-party websites/domains. For example, a website may require access to certain tracking and/or advertising domains (e.g. doubleclick.net). In an exemplary embodiment, the memory device 206 may include a mapping of one or more third-party domains that are triggered by the first-party domains.

The memory 206 may also include one or more memory caches stored therein. For example, a first memory cache may be stored in the memory 206, which may include domains which may have been previously determined to be "first-party" domains. In some embodiments, the first memory cache may be initially empty, which, for example, may make no a priori assumptions about what domains should be considered as first-party. Entries in the first memory cache may be set to expire by setting an expiration time equal to the current time plus a predetermined first memory cache time-to-live (TTL). Any entries older than the expiration time may be flushed from the cache. The optimal TTL setting may be a few seconds to several hours or days (or longer, depending on various criteria). According to some aspects, shorter times might not provide much added benefit from a tracking perspective and may end up causing the user to have to login to sites more frequently.

In exemplary embodiments, a second memory cache may include a ledger of domains, e.g. third-party domains, which have the potential for high privacy risk. For example, the ledger may be, but is not limited to, a key-value map where the keys are non-trivial domain names, e.g. a domain name with the leading protocol (e.g. https://) and common domain prefixes (e.g. www., www2., etc.) removed. The keys may be case-insensitive and converted to lowercase. The value may include, but is not limited to, a creation time, a rate limit, a time-to-live (TTL), and a rate counter that counts events over the time defined by the TTL. The ledger may include a record of requests for each domain contained within the ledger. The record of requests for each domain may be indexed for example, but not limited to, by a timestamp of the requests. The second memory cache may include a rate limit for each domain contained on the ledger that quantifies the risk.

In exemplary embodiments, a second memory cache may include a ledger of specific JavaScript functions for a plurality of domains, e.g. first-party and third-party domains, which have the potential for high privacy risk. The ledger may be maintained by a wrapper function, e.g. a JavaScript wrapper function, which encapsulates and guards access to certain functions of the client devices 106, e.g. JavaScript functions. The ledger may be, but is not limited to, a key-value map where the keys are non-trivial domain names, e.g. a domain name with the leading protocol (e.g. https://) and common domain prefixes (e.g. www., www2., etc.) removed. The keys may be case-insensitive and converted to lowercase. The value may include, but is not limited to, a creation time, a rate limit, a time-to-live (TTL), and a rate counter that counts events over the time defined by the TTL. The ledger may include a record of requests, e.g. JavaScript function requests, for each domain contained within the ledger. The record of requests for each domain may be indexed for example, but not limited to, by a timestamp of the requests. The second memory cache may include a rate limit for each domain contained on the ledger that quantifies the risk. The rate limit may be expressed as a number of allowed requests for each domain in a given time period or TTL. The TTL may be defined by a user of the client devices 106. For example, but not limited to, the TTL may be ten seconds.

Domains which have the potential for high privacy risk are identified either automatically by a monitoring device 102, for example, or manually by a network administration through control of the monitoring device 102. For automated implementations, the monitoring device 102 can assess privacy risk on a graduated scale and may not require manual review. The monitoring device 102 can be configured to assign a score to a domain which is correlated to the degree of potential privacy risk. According to an exemplary embodiment a score of one (1) can indicate a low risk, whereas a score of five (5) can indicate a high risk. A rate limiting ledger contains rate limits for specific JavaScript functions as already discussed. A rate limit is assigned to specific access functions (e.g., offsetWidth( )) based on the assigned privacy risk of a site. The wrapper function determines whether to provide full access to the original function, to return a falsified value, or to block the request with an error. Blocking the request with an error can interfere with a web page's original functionality by causing JavaScript errors. Exemplary embodiments, described herein allow a limited number of requests to succeed, which enables many websites to function as intended, while code (e.g., scripts) with the intent of tracking the user by probing JavaScript calls is defeated or blocked.

In exemplary embodiments, the memory 206 may be configured to store filtering data for use in filtering information from data packets received as part of TLS handshakes. Filtering data may include lists of cipher suites, supported curves, supported points, and other data that may be filtered out of a data packet for inclusion of remaining data in a data string built for device and application identification. The memory 206 may also store domain lists and counters related thereto, as well as other information for use in domain sorting and classification, as discussed below. The memory 206 may also be configured to store data based on transmissions to and from client devices 106 in the first network 118.

The memory 206 may further include one or more compatibility modules. The one or more compatibility modules are pre-packaged security policies associated with one or more destination endpoints such as, but not limited to, one or more computing devices, such as the client devices 106 or the computing device 114, or one or more computing device applications, or a website or remote application accessible over the Internet 112, etc. The compatibility modules enable the security and privacy methods and systems described herein such as browsing detection, device identification, domain profiling, first- and third-party identification, occlusion of network device TLS signatures, network client or application identification based on a TLS handshake, the rate-limiting policy, and/or the JavaScript functions described in detail below. The compatibility modules may be stored in for example, but not limited to, the memory 206 of the monitoring device 102, or a remote server associated with the monitoring device 102, or any other suitable storage device or storage location as desired. The pre-packaged security policies may consist of a set of configuration rules specific to the one or more destination endpoints (e.g., devices, domains, application, etc.). The pre-packaged security policies may also include metadata useful for displaying the security policies in a user interface of a client device 106 and for facilitating the searchability of the security policies. For example, a mobile application may require one or more domains to be whitelisted, e.g. be made first-party domains, which would otherwise be blocked, e.g. as third-party domains, because the domains may be non-obvious, difficult to identify, and/or tedious to manually manage. In some embodiments, the pre-packaged security policies may include rules regarding, for example, but not limited to, ports required, blocking or allowing specific resources (e.g., using AdBlock Plus format), and blocking or allowing individual cookies (e.g. based on the requesting domain and cookie name), etc. An example security policy to be enforced for Microsoft Office 365 may be as follows:

```
{
  "author": "Richard Stokes",
  "name": "Office 365",
  "description": "Various fixes for Office 365. Warning: Installing this module will significantly increase your privacy exposure to Microsoft and their affiliates.",
  "icon": "Office365png",
  "blockedDomains": [ ],
  "allowedDomains": ["Office365.com", "office.net", "onmicrosoft.com", "office.com", "microsoftonline.com", "live.com", "azure.net", "gfx.ms", "onestore.ms", "msecnd.net", "outlookgroups.ms", "msocdn.com", "cloudapp.net", "windows.net", "helpshift.com"],
  "ports": [ ],
  "abp": ["@microsoft.com/*/pixel.png"],
  "cookies": [{
      "domain": "leagueoflegends.com",
      "block": ["_ga"],
      "allow": ["userid", "nid"]
      }],
  "notes": "",
  "createDate": "7/23/2019",
  "modifyDate": "7/23/2019"
```

Figure 3A:
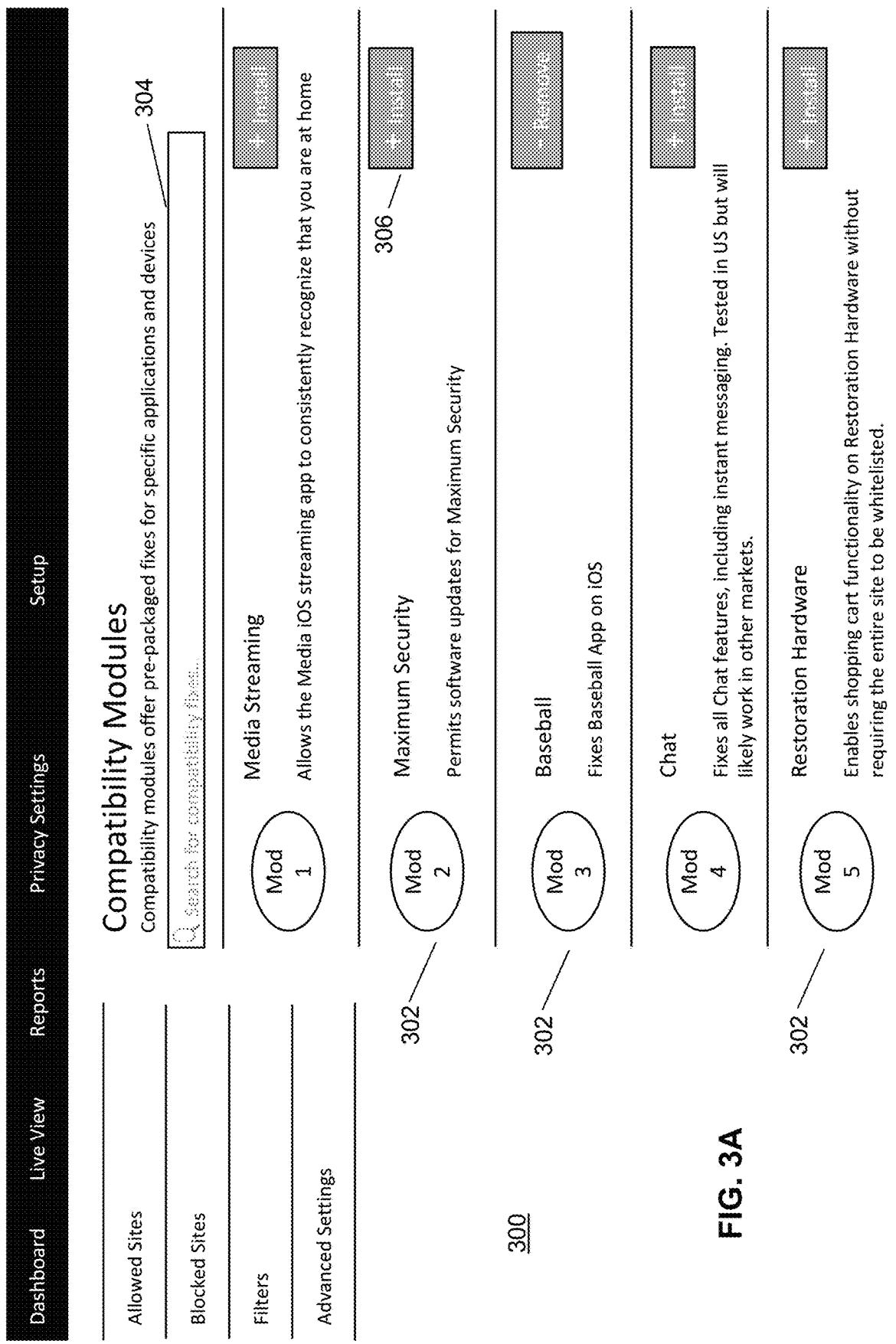
FIGS. 3A and 3B illustrate an exemplary user interface in accordance with exemplary embodiments.
Figure 3B:
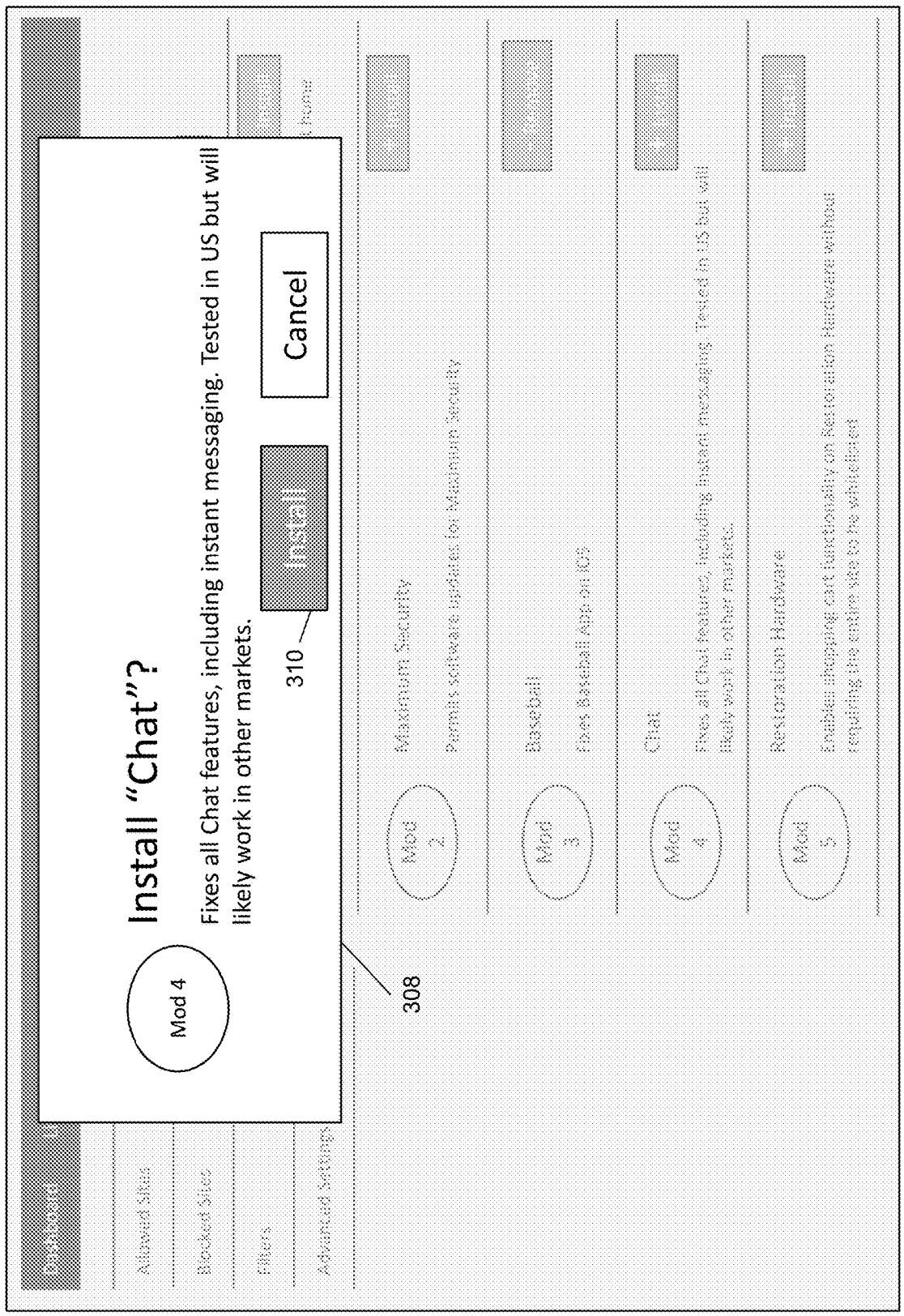

FIGS. 3A and 3B illustrate an exemplary user interface in accordance with an exemplary embodiment. As shown in FIG. 3A, the compatibility modules 302 may be presented to a user via a user interface 300, e.g., a user interface on a client device 106. The user interface 300 may be, for example, hosted on the monitoring device 102 or hosted remotely on a server associated with the monitoring device 102. For example, the user interface 300 may be, but is not limited to, a website or a remote application accessible over the Internet. In embodiments, the user interface 300 may include a search function 304 to enable a user to search for compatibility modules associated with destination endpoints including one or more computing devices, one or more computing device applications, or a website or remote application accessible over the Internet 112, as already discussed. The user interface 300 may further enable a user to install 306 the one or more of the compatibility modules 302 and/or review one or more of the compatibility modules 302 previously installed. As shown in FIG. 3B, for example, the user may search for a compatibility module 302 for a specific mobile application and select a compatibility module associated with that specific mobile application. According to exemplary embodiments of the present disclosure, the compatibility module may be presented to a user via a direct reference 308, such as, but not limited to, a URL that prompts the user to install 310 the compatibility module. The direct reference 308 may be presented to the user via the user interface or via other suitable communication means, e.g. e-mail, etc.

Referring back to FIG. 2, the monitoring device 102 may include a querying module 214. The querying module 214 may be configured to execute queries on databases to identify information. The querying module 214 may receive one or more data values or query strings, and may execute a query string based thereon on an indicated database, such as the memory 206 of the monitoring device 102 to identify information stored therein. The querying module 214 may then output the identified information to an appropriate engine or module of the monitoring device 102 as necessary. The querying module 214 may execute, for example, a query on the memory 206 of the monitoring device 102 to identify filtering lists for use in filtering data from received CLIENTHELLO packets, as discussed below.

The monitoring device 102 may also include a generation module 216. The generation module 216 may be configured to generate data for use by the monitoring device 102 in performing the functions discussed herein. The generation module 216 may receive instructions as input, may generate data based on the instructions, and may output the generated data to one or more modules of the monitoring device 102. For example, the generation module 216 may be configured to generate data strings for use in identifying client devices and application programs. The generation module 216 may also be configured to generate signature values by applying hashing algorithms to generated data strings, such as use of the MD5 hash or other suitable hashing algorithms as will be apparent to persons having skill in the relevant art.

The monitoring device 102 may also include a filtering module 218. The filtering module 218 may be configured to filter data for the monitoring device 102 as discussed herein. The filtering module 218 may receive data for filtering, may filter data from the data as instructed, and may output the resulting data to another module or engine of the monitoring device 102. In some cases, the filtering module 218 may receive data, such as from a web extension, to be used for the filter as input. In other cases, the filtering module 218 may identify such data, such as by requesting that the querying module 214 produce a filtering list from the memory 206. The filtering module 218 maybe configured, for example, to filter cipher suites, curves (e.g., elliptical), and points (e.g., elliptical curve points) from a CLIENTHELLO packet intercepted from a TLS handshake that is occurring using the first network 118.

The monitoring device 102 may also include a transmitting device 224. The transmitting device 224 may be configured to transmit data over one or more networks via one or more network protocols. In some instances, the transmitting device 224 may be configured to transmit data to the router 104, the client devices 106, the computing devices 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network, e.g. the network 118, and a second transmitting device for transmitting data via a wide area network, e.g., the Internet 112. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to and from the first network 118, such as to client devices 106, to the router 104, to computing devices 114, etc. In some cases, the transmitting device 224 may transmit data signals on behalf of client devices 106, where recipient devices (e.g., computing devices 114) may believe that the data signals originate from the client device 106, via the use of TLS occlusion by the monitoring device 102 as discussed below.

The present disclosure addresses the drawbacks of known software techniques by providing for domain correlation to be deduced from a hardware device (e.g., the monitoring device 102) distinct from the target computer. This device can be located either on the same subnet as the users' computer (e.g., a client device 106) or outside of the gateway or router 104 of the client device 106. Furthermore, the known concepts call for lists of specific sites to be maintained and checked for each request, which requires additional processing time as the lists of known sites grow longer. Exemplary embodiments of the present disclosure minimize the amount of algorithmic overhead and are thus suitable for use in high traffic environments (such as a home network) without introducing noticeable lag or other delays. This advantage is due primarily to the fact that the present disclosure enforces a short-lived data retention policy that does not accumulate large amounts of data from past user web activity.

According to some aspects, the monitoring device 102 can access the stream of network packets emanating from a client device 106 and thus must be logically located between the client device 106 and an external second network 120. One such configuration consists of locating the monitoring device 102 downstream of a router 104 or other upstream device, where it can intercept communications to and from the Internet 112. In some embodiments, multiple subnets and/or routers 104 can be connected to and/or communicate with the monitoring device 102. For example, the monitoring device 102 may include two or more LAN ports (or other modules), where each port can connect to a subnet.

Domain Profiling

Figure 4A:
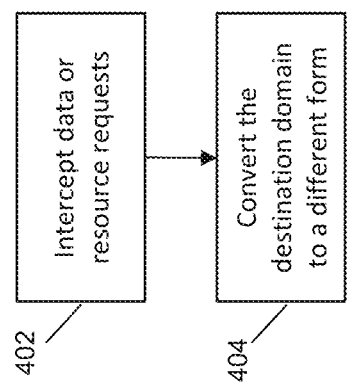
FIG. 4A is a flow chart illustrating a process for domain profiling according to an exemplary embodiment of the present disclosure.

FIG. 4A is a flow chart illustrating a process for domain profiling according to an exemplary embodiment of the present disclosure. As shown in FIG. 4A, the monitoring device 102 intercepts data or resource requests are intercepted by the monitoring device 102 (step 402). The monitoring device 102 can convert the destination domain for a request to a different form (step 404). This may be achieved by removing any subdomains from the destination domain down to the top-level ICANN-recognized domain suffix, then prepending the suffix with the first subdomain. For instance, "static.nytimes.com" may first be stripped of its leading subdomains "static" and "nytimes" leaving behind the ICANN domain suffix, ".com". The latter subdomain, "nytimes" is then concatenated with the ICANN suffix, resulting in "nytimes.com". Such a process may be used when maintaining the first- and third-party domain lists, which may be stored in a first memory cache and a second memory cache in the memory 206 of the monitoring device 102, respectively.

The use of the compatibility modules integrated with the monitoring device 102 may be able to address the above problems through the use of methods and systems discussed herein, as the monitoring device 102 provides for network monitoring and security outside of client devices 106. Some of the drawbacks with using prior existing software techniques include that it may not be possible, or practical, to install cybersecurity software on a client devices 106. For instance, many smart televisions, digital assistant devices, and other internet of things devices may not allow the user to install software or otherwise modify their behavior in a manner unintended by the original manufacturer. In addition, such devices may often secretly report user behavior to third parties without knowledge or explicit consent of the user, and there may be no way to block such reporting utilizing the inherent capabilities of the device itself.

Identification of First and Third Parties

Figure 4B:
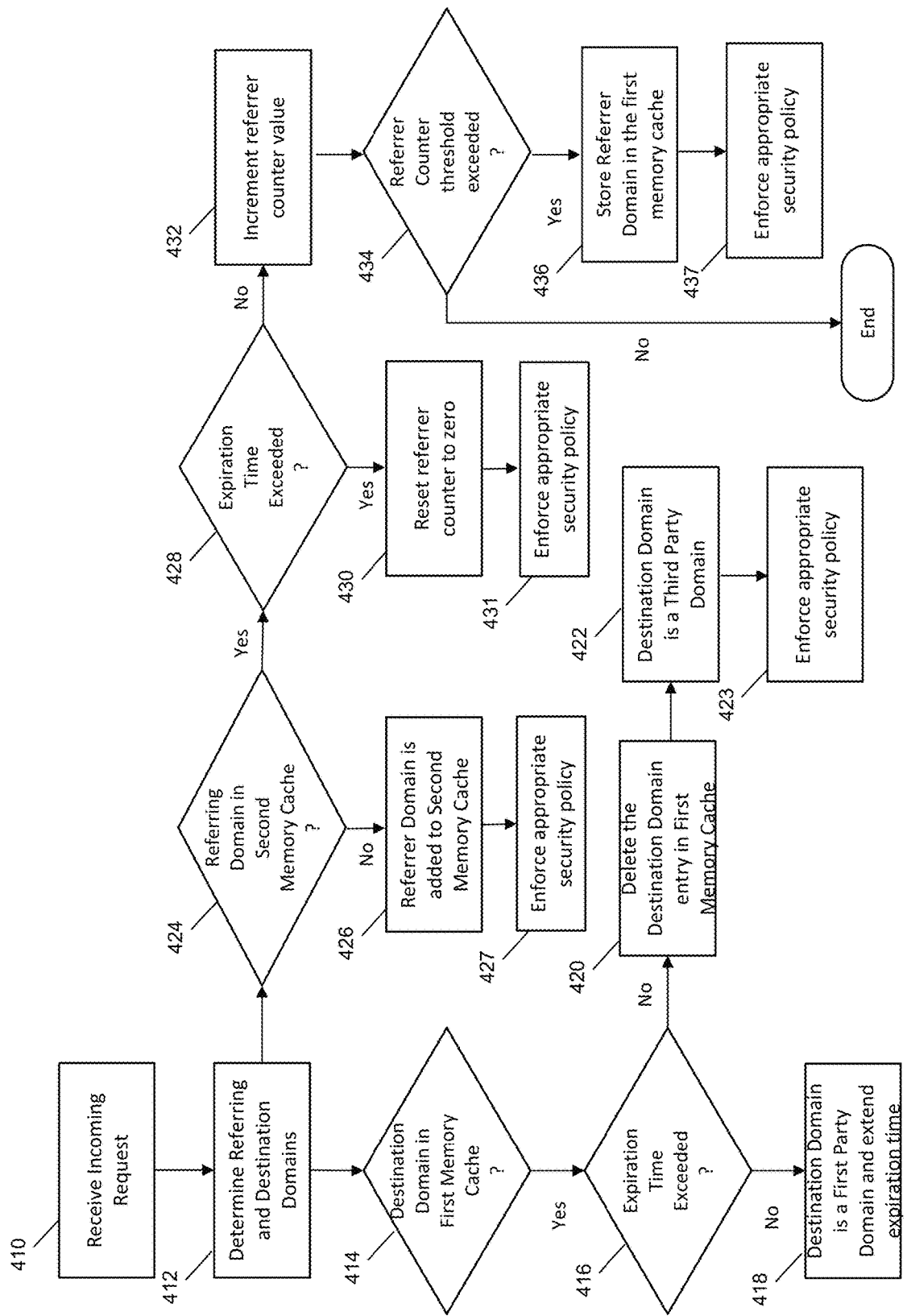
FIG. 4B is a flow chart illustrating a process for identifying first and third parties by the monitoring device in accordance with exemplary embodiments.

FIG. 4B illustrates a method for the identification of first and third parties in communications destined for the first network 118, as identified by the monitoring device 102 in the system 100. According to some aspects, the present disclosure relates to encrypted communications, such as transport layer security (TLS) communications. In some embodiments, the end user or client device 106 may authorize the monitoring device 102 to act on the user's or client's behalf by installing a trusted root certificate (e.g., one based on the ITU-T X.509 standard) on the target client device 106, which may enable the monitoring device 102 to intercept communications destined thereto.

In step 410, the monitoring device 102 may receive an incoming request by intercepting (e.g., by the receiving device 202) network packets included in a request for a web resource between the first network 118, such as from one or more client devices 106, and the second network 120, such as to the Internet 112 and/or a computing device 114. In step 412, the monitoring device 102 may decrypt the network packets included in the request to determine a referring and destination domain from the network packets. In some instances, the web request may contain minimal information about the source of the request other than a random source port, which may provide no information to determine the originating device or the location of the originating device. According to an exemplary embodiment, the router 104 may include a lookup table used to resolve these random source ports, but the monitoring device 102 may not have access to such data. As such, the monitoring device 102 may have to determine the source of the network packets independently.

In step 414, the monitoring device 102 may determine if the destination domain for the intercepted resource request exists in the first memory cache. In some cases, the monitoring device 102 may first convert the form of the destination domain as described according to FIG. 4A. According to another exemplary embodiment, the monitoring device 102 may utilize one or more of the compatibility modules already discussed to determine if there is a security policy associated with the destination domain. The querying module 214 of the monitoring device 102 may execute a query on the first memory cache to determine if the converted domain already exists in the first memory cache. The domains in the first memory cache are those which have been previously determined to be "First Party" domains. If there is a matching entry, then, in step 416, the monitoring device 102 determines whether an expiration time has been exceeded. The domain entries in the first cache are set to expire by setting an expiration time equal to the current time plus a predetermined time-to-live (TTL). According to an exemplary embodiment of the present disclosure, the TTL can be set at a value within the range of a few seconds (e.g., 3 to 5 seconds) to a few hours (e.g., 3 to 5 hours). If the expiration time has not been exceeded, then, in step 418, the request is determined to be a first party request, and the expiration time for the domain is extended (e.g., based on the current expiration time, a predetermined extension time, etc.). The process may then be completed. If, in step 416, the monitoring device 102 determines that the expiration time for the domain has elapsed, then the entry may be deleted from the first memory cache (e.g., by the querying module 214) (step 420). The request is then determined to be a third party request (step 422). The monitoring device 102 will then enforce the appropriate security policy against the domain (step 423).

In step 424, the monitoring device 102 may determine (e.g., using the querying module 214) if the referring domain for the request exists in a second memory cache in the memory 206 of the monitoring device 102. The second memory cache is maintained to record information about referring domains contained within inbound requests. For example, a referring domain can identify a server associated with the network on which the request originated. If there is no entry for the domain in the second memory cache, then, in step 426, the referring domain may be added to the second memory cache and a referrer counter value may be set to 0. The monitoring device 102 will then enforce the appropriate security policy against the domain (step 427). If, in step 424, the referrer domain is determined to exist in the second memory cache, then, in step 428, the monitoring device 102 determines whether an expiration time for that domain entry has been exceeded. If the expiration time has been exceeded, then the counter value is reset to zero (step 430). The monitoring device 102 will then enforce the appropriate security policy against the domain (step 431).

If the expiration time has not been exceeded the referring counter value is incremented (step 432). Once the referrer counter value has been incremented, then, in step 434, the monitoring device 102 determines whether the referrer counter value exceeds a threshold value. According to exemplary embodiments of the present disclosure the threshold value may be a predetermined value according to the specified domain, client device 106, computing device, 114, first network 118, etc. If the referrer counter value does not exceed the threshold, then the process ends. If the counter value exceeds the referrer count threshold, then the referrer domain may be stored in the first memory cache and its expiration time extended (step 436), as this may indicate sufficient requests to the same domain during a period of time to establish that domain as a first party domain. In some cases, the referrer domain may then be removed from the second memory cache. The monitoring device 102 will then enforce the appropriate security policy against the domain (step 437).

In executing the method of FIG. 4B, the monitoring device 102 can determine a user's intended web destination and treat resources required by that destination more favorably through the enforcement of less stringent security policies, while distinguishing them from third-party tracking sources which are called by the same website. As a result, the monitoring device 102 configured according to the exemplary embodiments disclosed herein can more aggressively apply or enforce security policies to filter tracking programs while preserving the intended functionality of the intended destination site.

Occlusion of Network Device TLS Signatures

Figure 5:
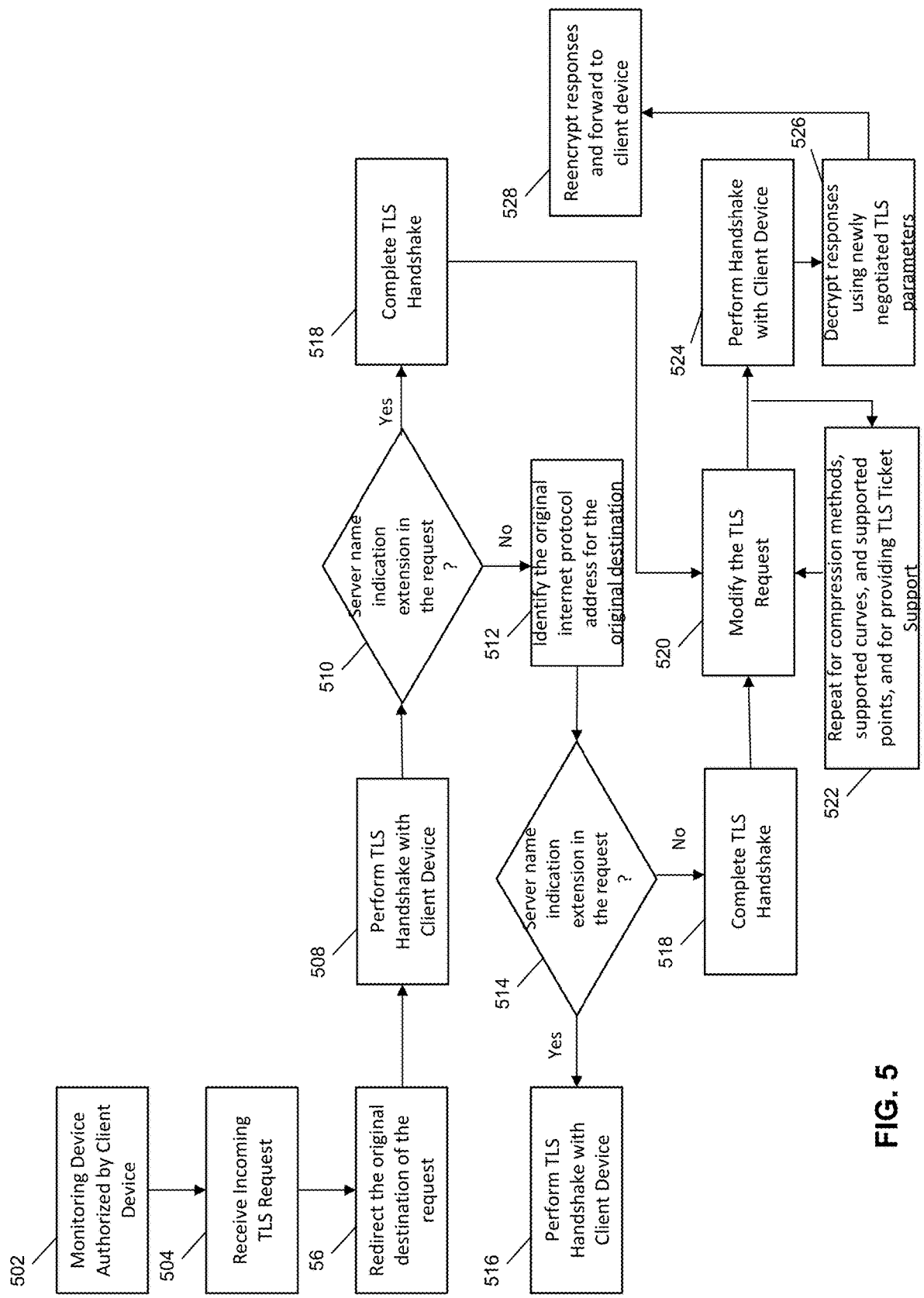
FIG. 5 is a flow chart illustrating a process for the occlusion of network device TLS signatures in accordance with exemplary embodiments.

FIG. 5 is a flow chart illustrating a process 500 for the occlusion of network device TLS signatures in the system 100 illustrated in FIG. 1. The method 500 addresses vulnerabilities associated with known methods which obscure device information communicated over the WAN and greatly reduce the attack surface of a TLS protocol, preventing attackers from learning critical details of the devices located behind a router or firewall.

For method 500, the monitoring device 102 is arranged in the first network 118 between the target device (e.g., client device 106) and the WAN 120. According to exemplary embodiments of the present disclosure, the client device 106 may be connected directly to the monitoring device 102 or indirectly, such as via the router 104 or other gateway device. Before the monitoring device 102 can perform any obscuring steps, the user of client device 106 must authorize the monitoring device 102 to act on its behalf by installing a "trusted root certificate" (step 502). In step 504, an inbound TLS request may be initiated by the client device. The monitoring device 102 may redirect the request from the original destination (e.g., a computing device 114 on the WAN 120) to a listening port of the receiving device 202 (step 506). According to an exemplary embodiment, the monitoring device 102 can perform the redirection transparently, such that the client device 106 may be unaware that it has not connected directly to the intended destination. For example, the monitoring device 102 may be configured to disguise the monitoring device 102 as the original destination server or as an intermediary device acting on behalf of the original destination server.

In step 508, a TLS handshake may occur between the client device 106 and the monitoring device 102. In step 510, the monitoring device 102 determines whether the server name indication extension is available in the request. If the extension is not available, then, in step 512, the monitoring device 102 identifies the original internet protocol address for the originally intended destination. According to an exemplary embodiment, the original internet protocol address can be identified by inspecting a CLIENTHELLO message for a server name field, which may indicate the intended destination of the original request. According to another exemplary embodiment, the monitoring device 102 may determine the original destination IP address of the request by inspecting networking protocol stack of the monitoring device 102 to. Once the original IP address is determined, the monitoring device 102 may determine in step 514 whether the original destination IP address is the local gateway of the first network 118 (e.g., the router 104). If the determination is true, this indicates a likely attempt by malicious software to probe the capabilities of the current network as a prelude to a cybersecurity attack. In such cases, the monitoring device 102 drops or cancels the TLS request to prevent such an attack or probe (step 516).

If, in step 514, the original destination IP address is determined to not be the local gateway, or in step 510 the server name indication extension is determined to be available, the monitoring device 102 completes the TLS handshake with the client device 106 according to known protocols and/or processing steps (step 518). In step 520, the monitoring device 102 modifies the TLS request by replacing the client device's cipher suite with a cipher suite belonging to the monitoring device 102. In step 524, the monitoring device 102 may then mirror the original TLS handshake request with the intended destination server, with the monitoring device 102 taking the place of the client device 106. According to exemplary embodiments of the present disclosure, step 520 can be repeated for updating compression methods, supported curves (e.g., elliptical), and supported points (e.g., curve points), and for providing TLS Ticket Support (step 522). As such, the monitoring device 120 can transparently upgrade any outdated and less secure TLS or other cryptographic protocols executed by a client device 106 to newer and stronger protocols without requiring the installation or modification of existing software being executed on the client device 102. The monitoring device 102 decrypts any responses received from the original destination server using the newly negotiated TLS or other suitable parameters (step 526). The decrypted responses are then re-encrypted using the original TLS parameters of the requesting client device 106 and the response is forwarded to the client device 106 (step 528).

The intention of the above modifications are that all device-specific differences with regards to the TLS protocol are obscured, thus preventing external parties from mining this data and potentially determining what types of devices are present on the network. According to an exemplary embodiment of the present disclosure, the monitoring device 102 can record or initiate recording by another device, the cipher suites, compression methods, supported curves, supported points, and/or TLS Ticket Support which clients offer during the initial TLS handshake. The recorded information can be used to determine the presence of outdated or less secure devices can be and be used to alert system administrators or network owners, enabling them to upgrade, replace or remove such devices from their networks before they can be compromised by an attacker.

Client Device and Application Identification

Figure 6:
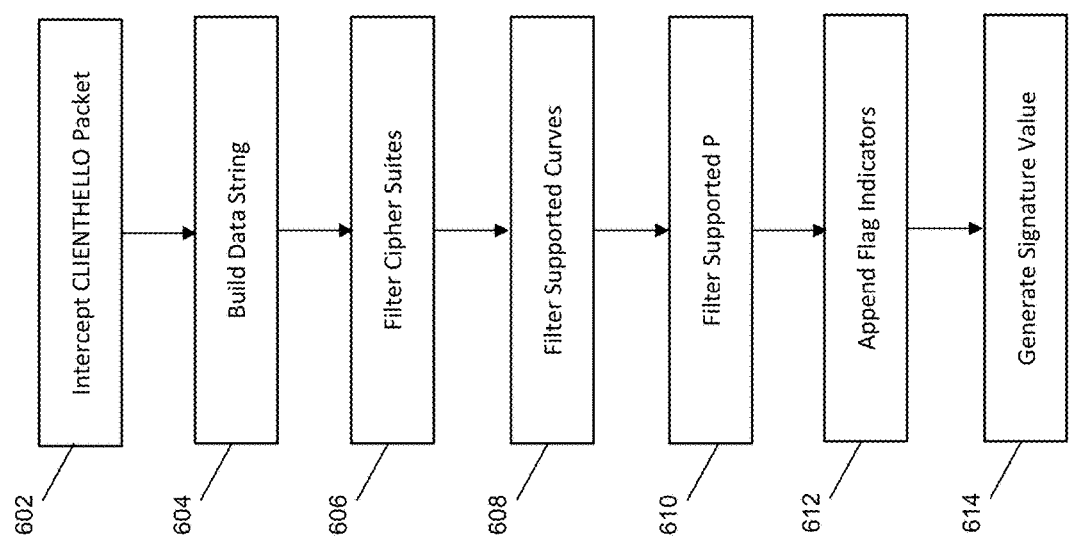
FIG. 6 is a flow chart illustrating a process for identifying a network client or application based on a TLS handshake in accordance with exemplary embodiments.

FIG. 6 illustrates a process 600 for identifying client devices and/or applications in a network through the use of a signature value generated via data identified in a filtered and intercepted TLS data packet.

In step 602, the monitoring device 102 may intercept a CLIENTHELLO packet that is transmitted to or from the first network 118 as part of a standard TLS handshake. In step 604, the generation module 216 of the monitoring device 102 may begin to build a data string, where the data string may begin with a TLS protocol version number. For example, TLS version 1.1 may become "11" in the data string, which may then be appended with a delimiter, such as a single dash (e.g., "-"). In step 606, the filtering module 218 of the monitoring device 102 may filter cipher suites from the CLIENTHELLO packet, such as from a filtering data list stored in the memory 206 of the monitoring device 102. The cipher suites in the filtering data list may be based on, for instance, cipher suites identified by a commonly used standard. The monitoring device 102 may filter the cipher suites, then convert, and concatenate the remaining cipher suites, which may then be appended to the data string and followed by another delimiter. For instance, in the above example, the data string may become "11-25706682-" after inclusion of cipher suites 2570 and 6682.

In step 608, the filtering module 218 of the monitoring device 102 may again filter the TLS CLIENTHELLO packet for supported curves using a filtering list available to the monitoring device 102. The remaining curves may be again appended to the data string with a delimiter. In the above example, the data string may become "11-25706682-64250-." In step 610, filtering may be performed again by the monitoring device 102 for the filtering of supported points. In cases where there may be no remaining points (e.g., or other values in the above filters), no data may be added to the data string, but the data string may again be appended with the delimiter. For instance, in the above example, if no points remain after filtering, the data string would become "11-25706682-64250-" due to the lack of points and addition of the next delimiter.

In step 612, the monitoring device 102 may continue to add additional data values to the data string with delimiters separating the data values, such as to include flags or other values as a result thereof. For instance, in the above example, data in the TLS packet regarding a compression method, if available, may be included, as well as a flag indicating of OCSP stapling is specified (e.g., where "S1" is used to indicate such a specification and "S0" to indicate no specification), a flag indicating if TLS tickets are supported (e.g., "T1" for support and "T0" for no support), and a flag indicating if Next protocol negotiation is supported (e.g., "N1" for support and "N0" for no support). In the example, the data string may become "11-25706682-64250-S0-T1-N0" if there are no compression methods, OSCP stapling and Next protocol negotiation are not supported, but TLS tickets are supported.

In step 614, the completed data string may be hashed by the generation module 216 of the monitoring device 102. The resulting signature value may be used as a unique identifier, which may be a single alphanumeric value generated via the hashing of the data string. For instance, the above example data string may yield the signature value of "5a4fb0c214b65f77ad91ea7ef67c60d1" if an MD5 hash is used. In some cases, the signature value may be suitable for use as a filename in an operating system, for use by the monitoring device 102.

Rate Limiting Access to Data Endpoints

Figure 7:
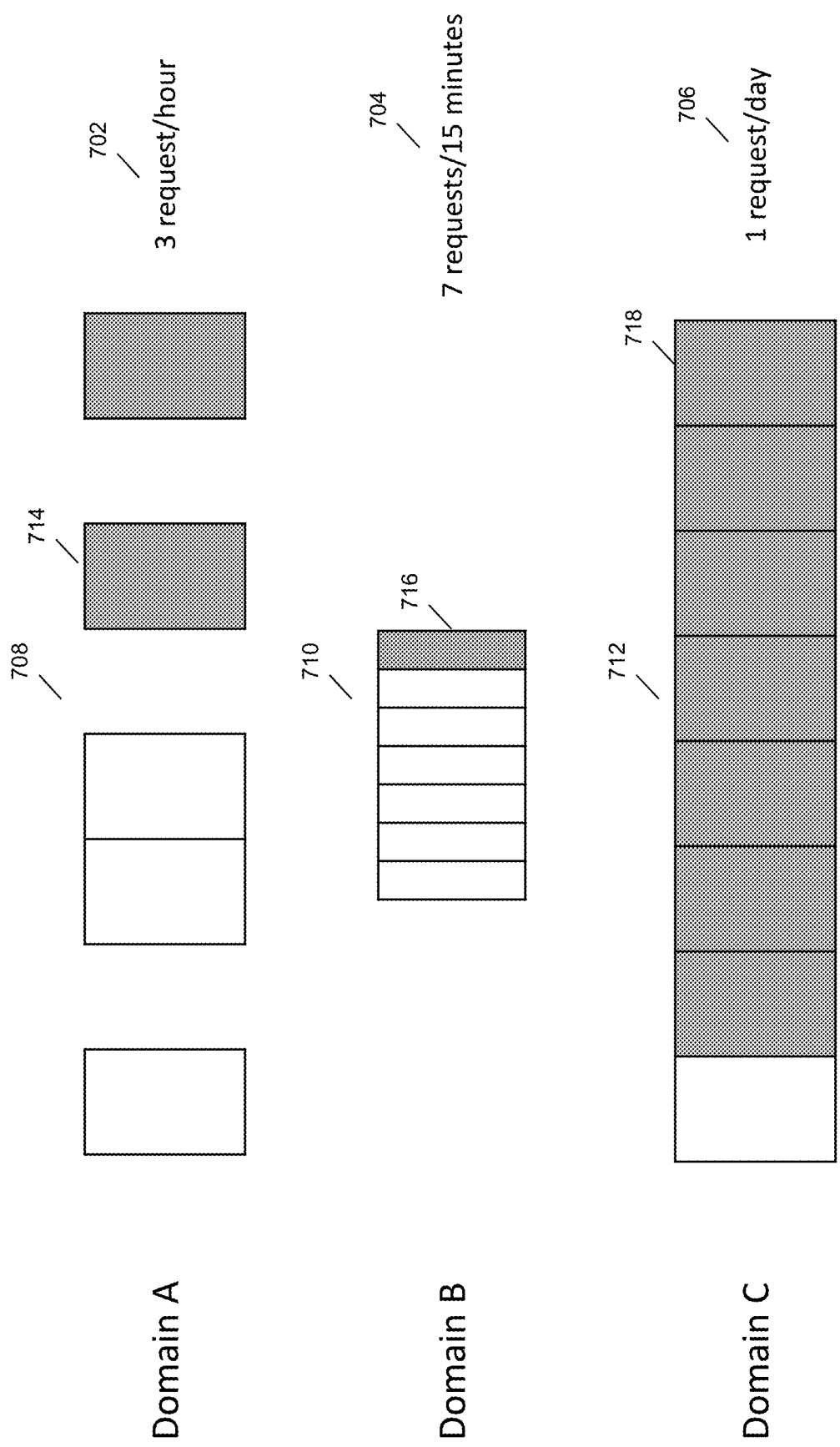
FIG. 7 is a block diagram illustrating rate limit ledgers in accordance with exemplary embodiments.

FIG. 7 is a block diagram illustrating rate limit ledgers in accordance with exemplary embodiments. The rate limits 702, 704, 706 may be expressed as a number of allowed requests for each domain in a given time period. For example, as shown in FIG. 7, the rate limit for a Domain A can be expressed as the number of requests in per hour or a specified number of hours. According to another exemplary embodiment, the rate limit for a Domain B can be expressed as the number of requests per minute or a specified number of minutes. According to yet another exemplary embodiment, the rate limit for a Domain C can be expressed as the number of requests per day or a specified number of days. It should be understood that the given time period can include any unit of time as desired by user or network administrator. Further, as shown in FIG. 7, the rate limit may be the same or different for each domain in the ledger 708, 710, 712. The time period of the rate limit, may be a time-to-live (TTL) for the ledger 708, 710, 712, such as a time period after which the request logs for the domain are dropped. As requests are made on the network (e.g. the first network 118), entries are added to the ledger for example, by a rate counter or a referrer counter. The rate counter or referrer counter may include one or more application program interface (API) functions such as, but not limited to, a value function that is called to retrieve the current value, and an increment function that is called to record an event (e.g. on the ledger). If the number of requests 714, 716, 718 made within the TTL exceeds the limit, any new requests are blocked until the current TTL expires. For instance, if the TTL is set to twenty-four hours, then the domain will be blocked until twenty-four hours after the request which triggered the block. This mechanism reduces processing time and allows endpoint blocking to proceed without triggering expensive blocklist lookups. While the second memory cache may be a part of the memory 206 on the monitoring device 102, it can be appreciated that the second memory cache may be located on any network device that has access to all endpoint requests on the first network 118.

Figure 8:
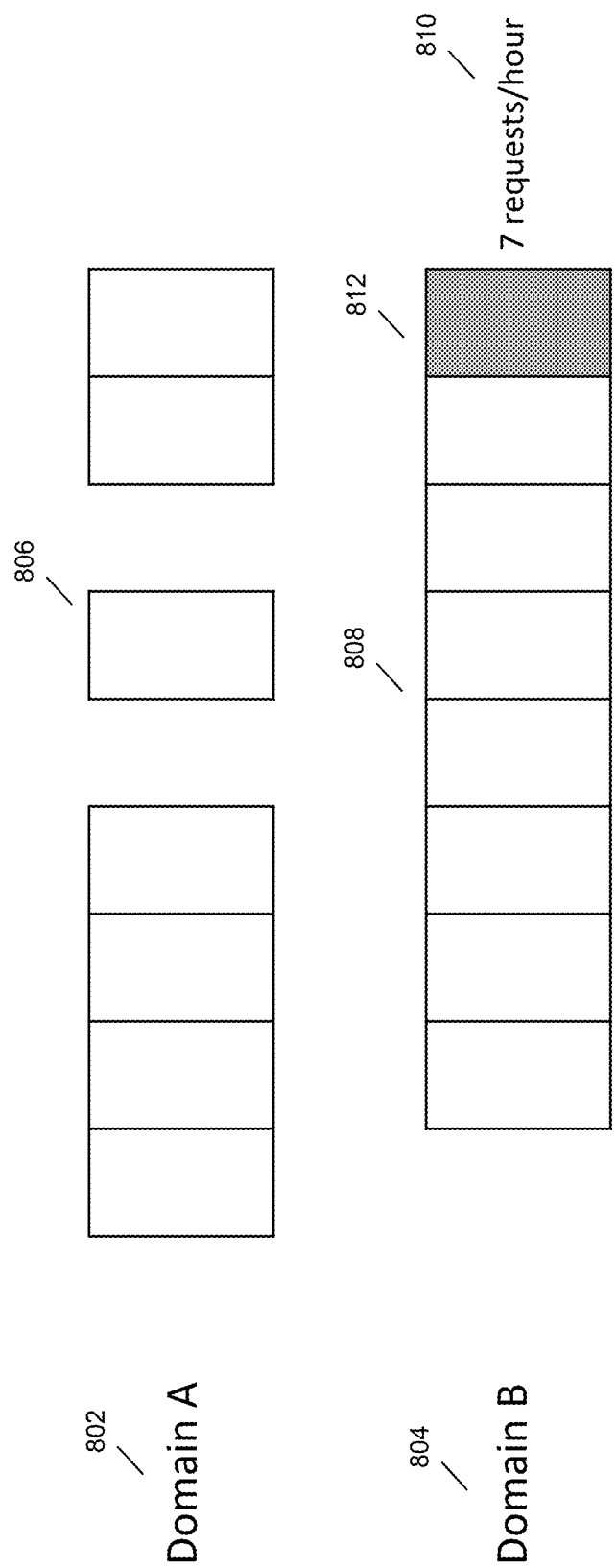
FIG. 8 illustrates trigger domain mapping in memory in accordance with exemplary embodiments.

According to an exemplary embodiment, the memory 206 may also be configured to maintain a mapping of trigger domains to blocked domains. FIG. 8 illustrates a trigger domain mapping in memory in accordance with exemplary embodiments. As shown in FIG. 8 Domain A may act as the triggering domain 802 and Domain B is the associated blocked domain 804 which must be temporarily unblocked to enable access to Domain A. A network device, such as the monitoring device 102, acting as a gateway can monitor the networks 118, 120 and when a request 806 to a triggering domain 802 is detected, a temporary rate limit 810 (see also FIG. 7) is automatically activated for the blocked domain 804. Thus, when Domain A is intentionally navigated to by a user, a limited number of requests 808 to Domain B are allowed on the network based according to the temporary rate limit 810. The rate limit is automatically disabled after a pre-determined period of time (e.g., one hour) but can be extended upon further requests to the originating domain. The mapping of triggering domains 802 to blocked domains 804 can be manually implemented by the network administrator or automatically determined by some other security requirement or protocol as desired. According to the mapping shown in FIG. 8, a monitoring device 102 can restrict or allow access to blocked domains without the need for software embedded within client applications or browsers (i.e., web extensions).

Figure 9:
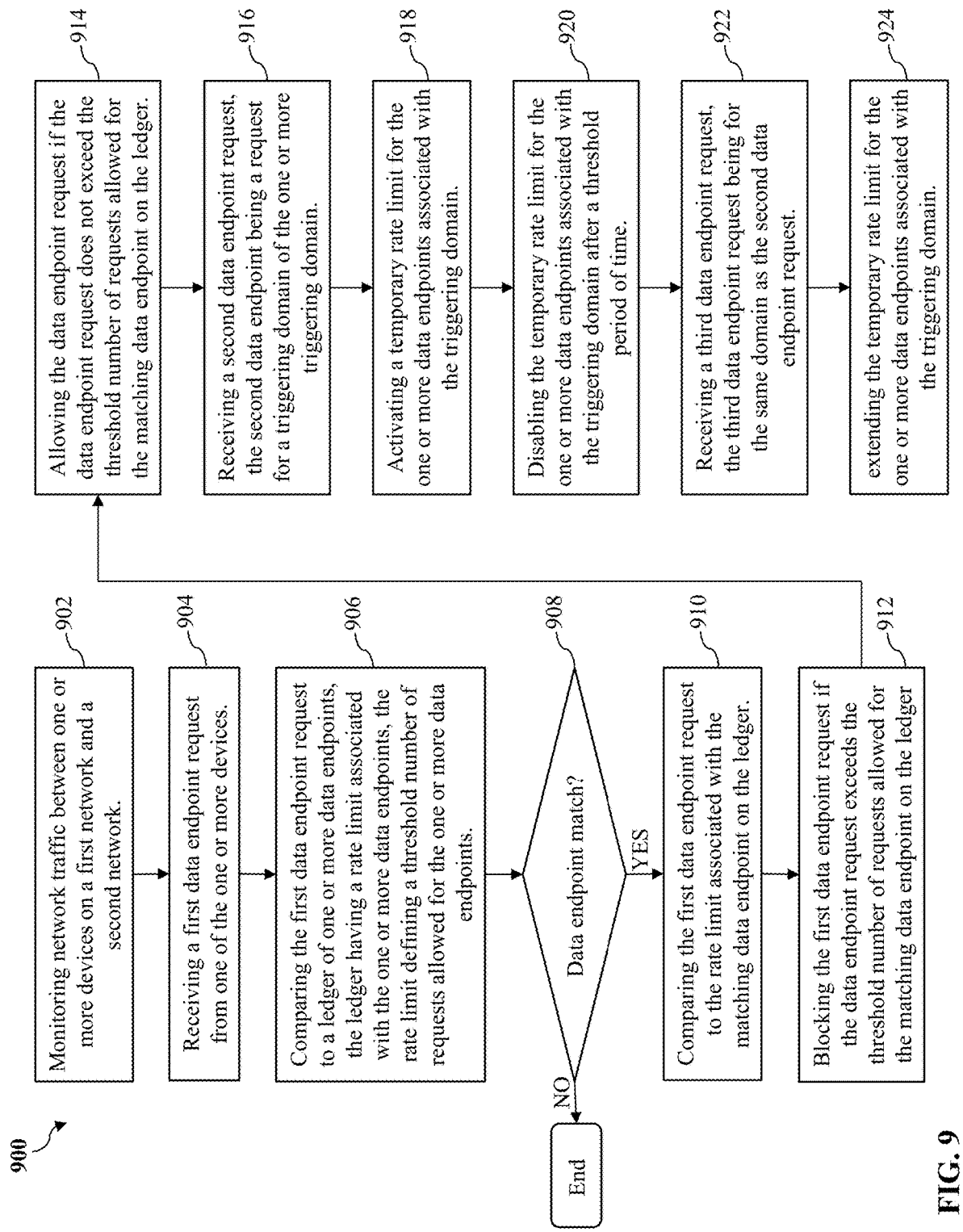
FIG. 9 is a flow chart illustrating an example method 900 for rate limiting access to data endpoints in accordance with exemplary embodiments

FIG. 9 illustrates a method 900 for rate limiting access to data endpoints in accordance with exemplary embodiments.

In step 902, a network device monitors traffic between one or more devices on a first network 118 and a second network 120. For example, the monitoring device 102 may monitor network traffic between the client devices 106 on the network 118 and the computing devices 114 on the second network 120.

In step 904, the monitoring device 102 can receive a first data endpoint request (e.g., a domain request) from one of the one or more client devices 106 on the first network 118.

In step 906, the monitoring device 102 can compare the first data endpoint request to a ledger 708, 710, 712 of one or more data endpoints. The ledger 708 may define a rate limit 702, 704, 706 associated with the one or more data endpoints. For example, the rate limit 702, 704, 706 may be a number of times the one or more domains may be requested in a period of time as discussed above with reference to FIGS. 7-8. The one or more data endpoints on the ledger 708, 710, 712 may be data endpoints that are a privacy risk to the one or more devices on the first network 118. For example, the one or more data endpoints may be domains known for the primary purpose of advertising and/or tracking user on the client devices 106. In an exemplary embodiment, the ledger 708, 710, 712 may include a mapping of one or more triggering domains 802 associated with each of the one or more data endpoints. For example, a first-party domain (e.g. triggering domain 802) may require access to a third-party domain (e.g. blocked domain 804) in order to properly function. As a result, the monitoring device 102 can be configured to automatically control access to a first-party domain which monitors or tracks user activity.

In step 908 the monitoring device 102 can determine if the first data endpoint request matches one or more of the data endpoints on the ledger 708, 710, 712. If the first data endpoint request does match one or more of the data endpoints on the ledger 708, 710, 712, the monitoring device 102 compares the first data endpoint request to the rate limit 702, 704, 706 associated with the matching data endpoint on the ledger 708, 710, 712 (step 910).

In step 912, the monitoring device 102 blocks the first data endpoint request if (e.g., when) the data endpoint request exceeds the threshold number of requests allowed for the matching data endpoint on the ledger 708, 710, 712. For example, the first data endpoint request may be for a domain with a rate limit of three requests per hour and the first data endpoint request is the fourth request or higher for that domain. Therefore, access to the domain in the first data endpoint request would be blocked.

In a step 914, the monitoring device 102 allows the data endpoint request if (e.g., when) the data endpoint request does not exceed the threshold number of requests allowed for the matching data endpoint on the ledger. For example, the first data endpoint request may be for a domain with a rate limit of three requests per hour and the first data endpoint request is the third request or lower for that domain. Therefore, access to the domain in the first data endpoint request would be allowed.

In step 916, the monitoring device 102 receives a second data endpoint request, the second data endpoint being a request for a triggering domain 802 of the one or more data endpoints, the triggering domain 802 being listed in the mapping from the client device 106a.

In step 918, the monitoring device 102 activates a temporary rate limit 810 for the one or more data endpoints associated with the triggering domain, which can allow all requests for the one or more endpoints associated with the triggering domain 802 for a specified period of time, e.g. five minutes, or can perform some other access control function with regard to the requested one or more endpoints as desired.

In step 920, the monitoring device 102 disables the temporary rate limit 810 for the one or more data endpoints associated with the triggering domain 802 after a threshold period of time. For example, the monitoring device 102 may disable access to the one or more endpoints associated with the triggering domain 802 after the time period of the temporary rate limit 810 has lapsed, e.g. after five minutes.

According to exemplary embodiments, the monitoring device 102 receives a third data endpoint request (step 922). The third data endpoint request may be for the same domain as the second data endpoint request and the monitoring device 102 may extend the temporary rate limit 810 for the one or more data endpoints associated with the triggering domain (step 924).

Rate Limiting JavaScript Functions

Figure 10:
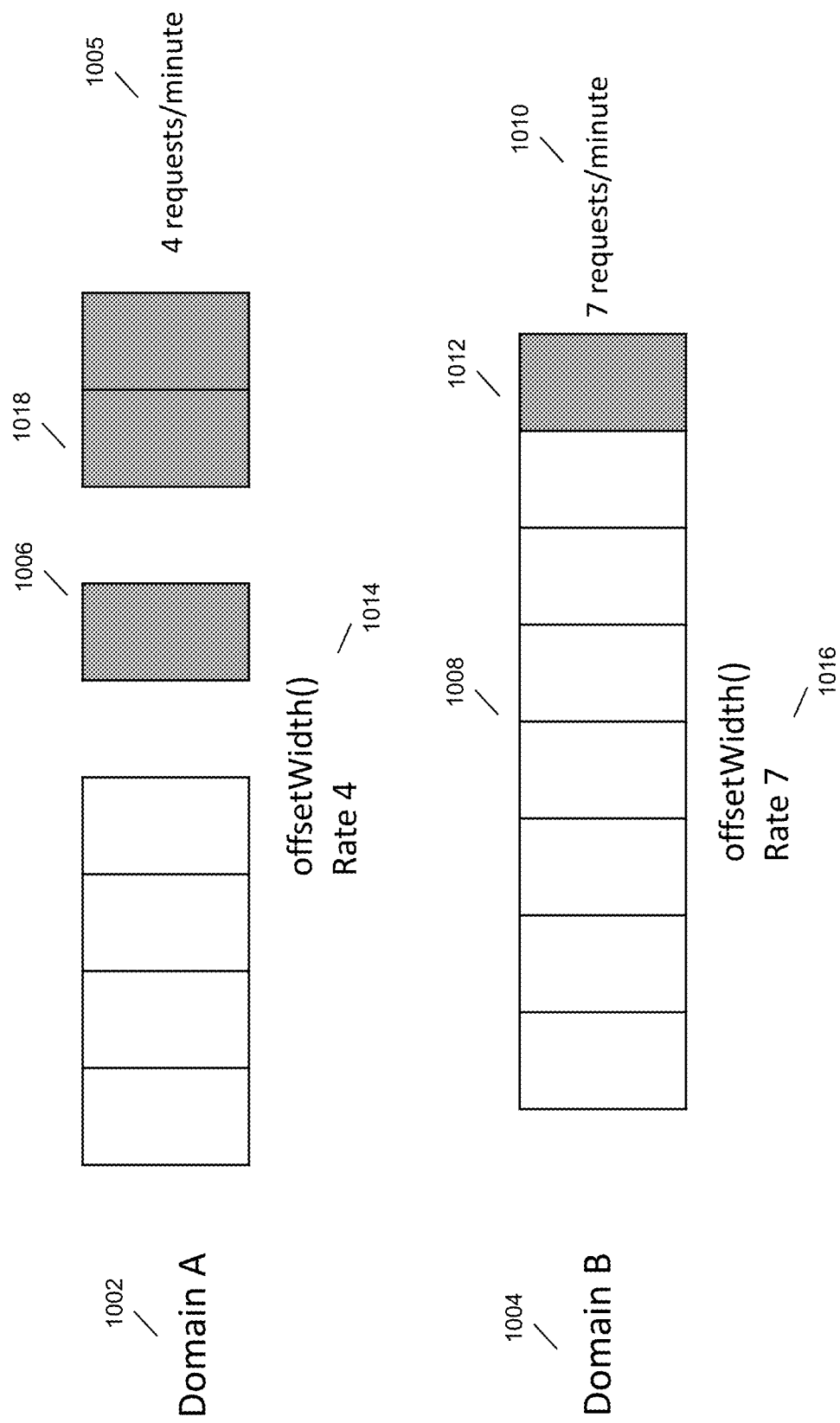
FIG. 10 is a block diagram illustrating rate limit ledgers in accordance with exemplary embodiments.

FIG. 10 is a block diagram illustrating rate limit ledgers in accordance with exemplary embodiments. The rate limits 1005, 1010 may be expressed as a number of allowed requests for each domain in a given time period. In exemplary embodiments, the TTL duration is short as most tracking attempts, e.g. JavaScript function requests, occur within the first few seconds of page load, e.g. website access. However, it can be appreciated that longer TTL duration times may be advantageous as certain domains and user tracking/advertising technologies continually track users of the client devices 106 as they interact with the domains. Further, the rate limit may be the same or different for each domain in the ledger. For example, as shown in FIG. 10, the rate limit for Domains A and B 1002, 1004 can be expressed as the number of requests in per minute or a specified number of minutes. According to another exemplary embodiment, the rate limit for a Domain can be expressed as the number of requests per hour or a specified number of hours. According to yet another exemplary embodiment, the rate limit for a Domain can be expressed as the number of requests per day or a specified number of days. It should be understood that the given time period can include any unit of time as desired by user or network administrator. Further, as shown in FIG. 10, the rate limit may be the same or different for each domain 1002, 1004 in the ledger 1006, 1008. The time period of the rate limit 1014, 1016, may be a TTL for the ledger 1006, 1008, such as a time period after which the request logs for the domain are dropped. As requests are made on the network (e.g. the first network 118), entries are added to the ledger for example, by a rate counter or a referrer counter. The rate counter or referrer counter may include one or more application program interface (API) functions such as, but not limited to, a value function that is called to retrieve the current value, and an increment function that is called to record an event (e.g. on the ledger). If the number of requests 1012, 1018 made within the TTL exceeds the limit, any new requests are blocked until the current TTL expires. For instance, if the TTL is set to twenty-four hours, then the domain will be blocked until twenty-four hours after the request which triggered the block. This mechanism reduces processing time and allows domain blocking to proceed without triggering expensive blocklist lookups. While the second memory cache may be a part of the memory 206 on the monitoring device 102, it can be appreciated that the second memory cache may be located on any network device that has access to all domain requests on the first network 118.

According to an exemplary embodiment, the memory may also be configured to maintain a mapping of trigger domains to blocked domains. As shown in FIG. 10, Domain A 1002 may act as the triggering domain and Domain B 1004 is the associated blocked domain which must be temporarily unblocked to enable access. A network device, such as the monitoring device 102, acting as a gateway can monitor the networks 118, 120 and when a request to a triggering domain 1002 is detected, a temporary rate limit 1010 is automatically activated for the blocked domain 1004. Thus, when Domain A is intentionally navigated to by a user, a limited number of requests 1012 to Domain B are allowed on the network based according to the temporary rate limit 1010. The rate limit is automatically disabled after a pre-determined period of time (e.g., one minute) but can be extended upon further requests to the originating domain. The mapping of triggering domains 1002 to blocked domains 1004 can be manually implemented by the network administrator or automatically determined by some other security requirement or protocol as desired. According to the mapping shown in FIG. 10, a monitoring device 102 can restrict or allow access to blocked domains without the need for software embedded within client applications or browsers (i.e., web extensions).

Exemplary embodiments of the present disclosure can limit the access of JavaScript detecting functions either globally or on a per-site basis. As requests are made on the network (e.g. the first network 118), entries are added to the ledger for example, by a rate counter or a referrer counter. The rate counter or referrer counter may have an optional resolution, e.g. one second, such that multiple events recorded within the resolution period are aggregated. Aggregating multiple events within a resolution period facilitates the reduction in utilization of memory, e.g. the memory 206, and improves performance of the monitoring device 102 and/or client devices 106. In exemplary embodiment, a resolution of for example, but not limited to, five percent of the total TTL is optimal. The rate counter or referrer counter may include one or more application program interface (API) functions such as, but not limited to, a value function that is called to retrieve the current value, and an increment function that is called to record an event (e.g. on the ledger). If the number of requests made within the TTL exceeds the limit, the requests are blocked until the current TTL expires. For instance, if the TTL is set to twenty-four hours, then the domain will be blocked until twenty-four hours after the request which triggered the block. This mechanism reduces processing time and allows domain blocking to proceed without triggering expensive blocklist lookups. The rate counter or referrer counter may delete requests on the ledger that are older than the TTL for those requests. The rate counter or referrer counter may report the number of the total number of requests recorded for a domain during any given TTL. The ledger may clean itself periodically for example, but not limited to, iterating through each entry on the ledger and deleting each entry that is older than a current TTL or that reports a value of zero. This allows the ledger to remain small and optimizes ledger performance. While the second memory cache may be a part of the memory 206 on the monitoring device 102, it can be appreciated that the second memory cache may be located on any network device that has access to domain requests made on the first network 118, e.g. the client devices 106.

In an exemplary embodiment, the ledger and wrapper functions contained within the ledger are run within the context of a webpage, e.g. a data endpoint or domain. For example, the communications interception and ledger logic may be encapsulated within a JavaScript file. The JavaScript file may be injected into a web page, e.g. data endpoint or domain, through any suitable means such as, but not limited to, by a man-in-the-middle interception technique, or by a web extension that may be installed by a user on a web browser, e.g. the client device 106b, etc. In an exemplary embodiment, the web extension has three logical components including a background script, a content script, and an intercept script. The background script can maintain a list of domains and an associated privacy risk of those domains as discussed above and below. This list may be automatically generated by the background script or loaded via other means, including API calls to a connected network device intentionally created for this purpose, e.g. the monitoring device 102. The background script provides access to the content scripts that request the privacy risk. Further, the background script can maintain a list of the rate limits for one or more JavaScript functions. The content script can run within the scope of a browser tab, e.g. a browser tab of the client device 106b. The content script can have access to various properties of the web page, e.g. data endpoint or domain, but has limited access to the web page itself. The content script can query the background script for the rate limit table and privacy risk score for the currently loaded top level domain and subrequest domains.

After loading, the content script injects the intercept script along with the rate limiting policies into the current web page. The intercept script measures the rate at which specific JavaScript functions are called by scripts loaded by the original page. The intercept script can allow, block or falsify the results of these calls based on the rate limiting policies which were set by the content script. The web extension may consist of a single background script that is global to the browser, e.g. the client device 106b, and multiple content scripts and intercept scripts, one for each currently loaded tab on the web browser, e.g. the client device 106b. In an exemplary embodiment, the web extension can allow a user to disable rate limiting for user specified domains, e.g. "whitelist" specified domains. For example, the rate limiting may interfere with the functionality of certain domains which may be inconvenient to the user; thus, the user can disable the rate limiting associated with that domain to enable the domain to function properly. The user may disable the rate limiting on an ad-hoc basis directly from within the web extension on the client device 106b. For example, the web extension can provide a user interface on the client device 106b that allows a user to interact with the web extension. The user interface may be served by a network connected device, e.g. the client device 106b, or by a web server located on a cloud, e.g. the computing device 114 on the second network 120.

Figure 11:
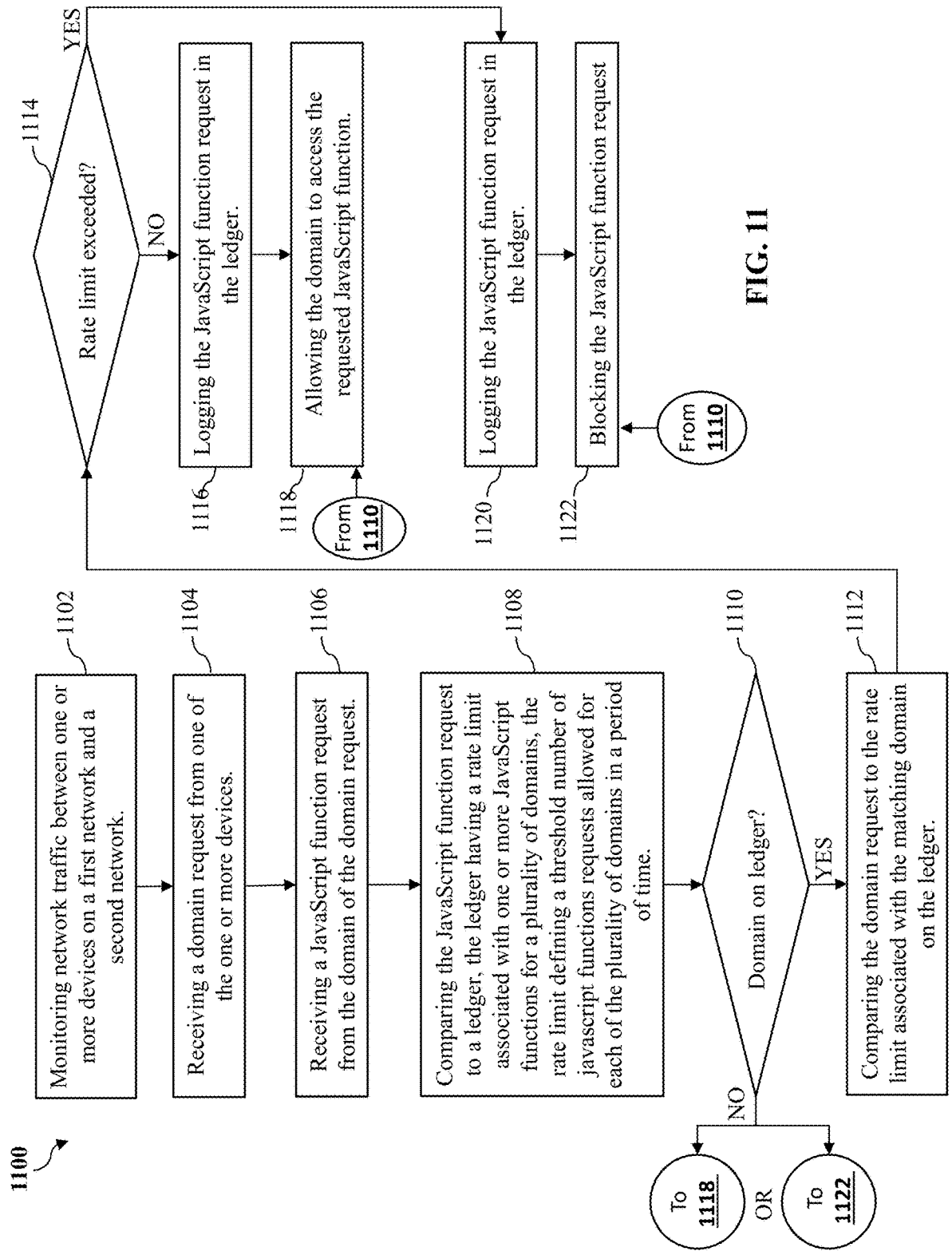
FIG. 11 is a flowchart illustrating an example method 1100 for rate limiting JavaScript functions in accordance with exemplary embodiments.

FIG. 11 illustrates a method 1100 for rate limiting JavaScript functions in accordance with exemplary embodiments.

In step 1102, the monitoring device 102 may monitor network traffic between the client devices 106 on the network 118 and the computing devices 114 on the second network 120. In an exemplary embodiment, the client device 106 is a web browsing application, e.g. the client device 106*b*.

In step 1104, the monitoring device 102 may receive a domain request, e.g. a website request, from the client device 106*b*. The monitoring device can receive a JavaScript function request from the data endpoint of the data endpoint request (step 1106). For example, the domain may be a website hosted by the computing device 114*a* (e.g. a data endpoint) and the monitoring device 102 may receive a JavaScript request from the computing device 114*a*. The JavaScript function request may be, but is not limited to, a request to identify one or more fonts on the client device 106*b*.

In step 1108 the monitoring device 102 can compare the JavaScript function request to a ledger, the ledger having a rate limit associated with one or more JavaScript functions for a plurality of domains. The rate limit may define a threshold number of JavaScript functions requests allowed for each of the plurality of domains in a period of time. For example, the requested domain, e.g. a website, may be listed in the ledger with a rate limit of four JavaScript function requests per minute. Thus, the domain would only be allowed to request execute a request to detect the fonts of the client device 106*b* four times/minute. In exemplary embodiments, the JavaScript function request may come from the requested domain, e.g. a First Party domain, or a domain associated with the First Party domain, e.g. a Third Party domain. For example, the domain request may be for a well-known news website, but the JavaScript function request may come from a tracking and/or advertising domain associated with the news site, e.g. doubleclick.net.

The monitoring device 102 may determine whether the domain matches one or more of the plurality of domains on the ledger (step 1110). If (e.g., when) the domain does not match one or more of the plurality of domains on the ledger, the monitoring device 102 may proceed to step 1118 or step 1122. The execution of steps 1118 or 1122 in response to the domain not matching one or more of the plurality of domains on the ledger may depend on a system default setting, a user preference, or other setting, value, or state of the client device 106*b*. For example, the client device 106*b* may have a default setting to block all JavaScript function requests from domains not listed on the ledger.

If (e.g., when) the domain does match one or more of the plurality of domains on the ledger, the monitoring device 102 may compare the domain request to the rate limit associated with the matching domain on the ledger (step 1112). For example, the domain may issue a JavaScript request to detect one or more fonts on the client device 106*b* and the ledger may indicate that the domain has an associated rate limit for that particular type of JavaScript request, e.g. four times per minute. If the rate limit is determined not to have been exceeded (step 1114), the monitoring device 102 may log the JavaScript function request in the ledger (step 1116). In step 1118, the monitoring device 102 may allow the JavaScript function request. For example, if the JavaScript function request is a first, second, third, or fourth request in a minute, the monitoring device 102 will allow the JavaScript function request to proceed, e.g. probe the client device 106*b* for one or more fonts. If the rate limit has been exceeded, the monitoring device 102 may log the JavaScript function request in the ledger (step 1120). For example, the ledger logs each JavaScript function request to enable the tracing of the number of JavaScript function requests made by the data endpoint. In exemplary embodiments, the ledger may be maintained in the memory 206 of the monitoring device 102 and/or client devices 106 by a wrapper function that encapsulates and guards access to the JavaScript functions of the client device 106. At step 1122, the monitoring device 102 may block the JavaScript function request. The JavaScript function request may be blocked for example, but not limited to, blocking the request with an error, or returning a falsified value to the data endpoint, etc.

Web Extension

Figure 12:
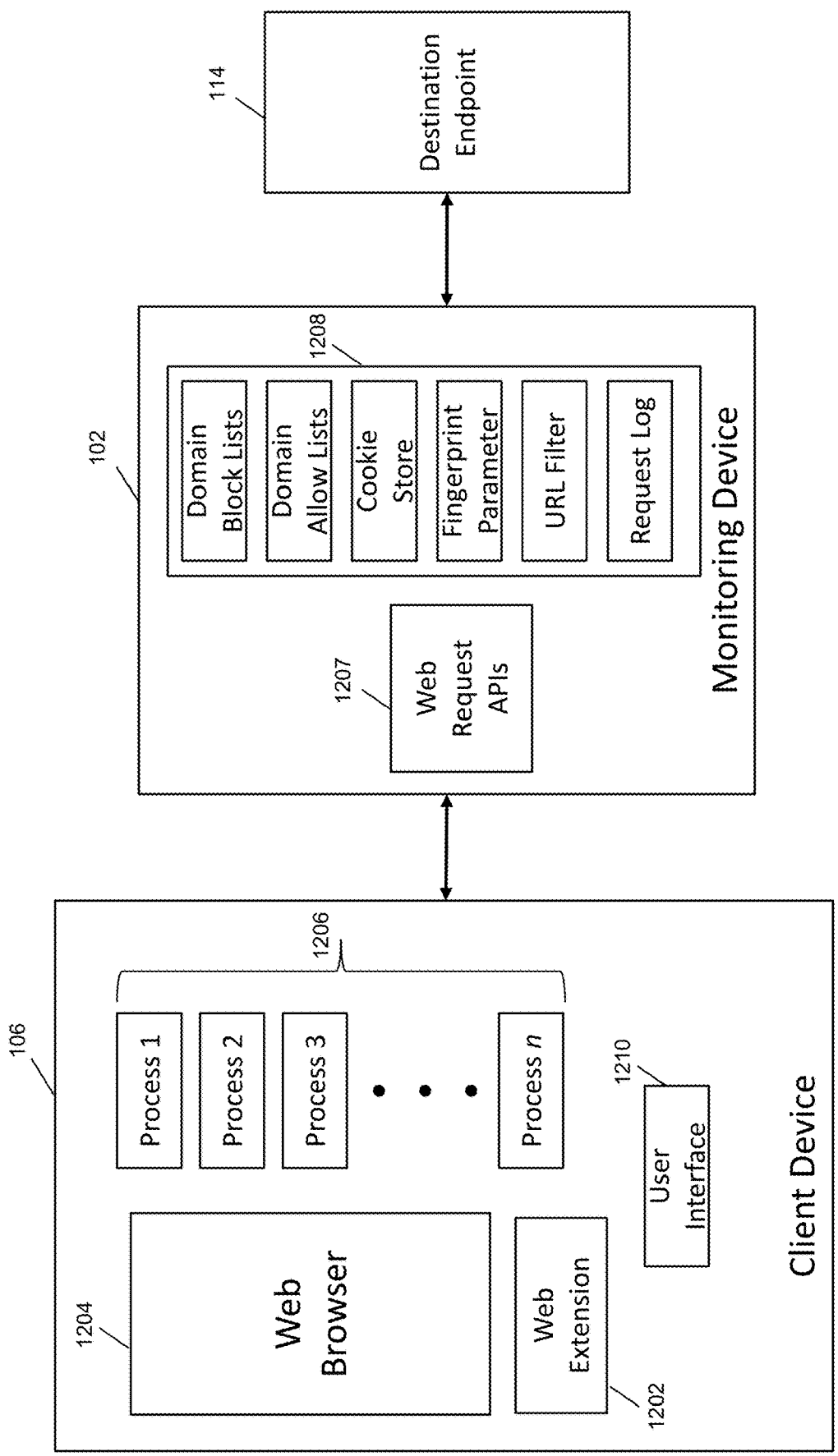
FIG. 12 is a block diagram illustrating a web extension of a client device in accordance with exemplary embodiments.

FIG. 12 is a block diagram illustrating the system 100 as configured for web filtering in accordance with exemplary embodiments.

As shown in FIG. 12, the web extension 1202 is associated with a domain on a network by being hosted in a web browser 1204. Web browsers 1204 can be configured to host web pages 1206 according to an in-memory process executed by a client device 106. As a result, the web browser 1204 can isolate web pages from one another and prevent cross-process attacks. The web extension 1202 may be an extension one of the client devices 106 and associated with the web browsing application 1204. The web extension 1202 can be configured to access a large in-memory database, which can be hosted by the monitoring device 102 and includes blocklists, allow lists, and other rules which can be dynamically applied to web pages as they are loaded. The blocklists, allow lists, and other rules enable the web extension 1202 to block ads or enhance user privacy. In known implementations, web extensions can be subject to browser-specific limitations on what data can be shared between tabs (e.g., processes), which results in redundant processing and storage needs, high memory usage and slower performance. According to exemplary embodiments of the present disclosure, the large in-memory database is stored on the monitoring device 102. Exemplary embodiments of the present disclosure, implement APIs that prevent a web extension from maintaining a persistent state, such that the web browser 1204 must enforce memory management policies without input from other system components. Thus, according to exemplary embodiments disclosed herein, the web extension 1202 is configured to communicate over the network to access the in-memory database stored on the monitoring device 102. As a result, the web extension 1202 can perform web filtering operations for providing privacy protection and/or ad blocking for web browsers that permit or do not permit web pages to be filtered.

The web extension 1202 of the present disclosure can improve the performance of a web browser by offloading expensive web filtering processes to a separate network or client device, such as the monitoring device 102. This offloading allows the RAM and CPU utilization on the client device 106 to be reduced. Moreover, the configuration of the web extension on a separate network or client device can provide greater network security by passing control of privacy policies from individual users to a network operator or administrator having control of the network device configured with the web extension.

The client device 106 can be configured with various hardware and software components for requesting data stored or executing on the network 120. For example, as shown in FIG. 12, the client device 106 can be configured with software applications such as a web browser 1204 and one or more processes 906 which can be executed in combination with the web browser 1204 for requesting data from devices 114 on the second network 120 (e.g. a WAN). The web extension 1202 in communication with the monitoring device 102 interacts with the client device 106 to observe and analyze traffic and to intercept, block, or modify web requests in-flight and/or in real-time using, for example, one or more web request APIs 1207. According to an exemplary embodiment, the web extension 1202 can be configured to perform web filtering operations on a web request by accessing one or more of the web filtering APIs 1207 of the monitoring device 102 including, for example, domain block lists, domain allow lists, a cookie store, fingerprint parameters, a URL filter, and a request log, or any other suitable API as desired.

During operation, the web extension 1202 can be configured discover the presence of a connected network device 106 on the second network 120 (e.g. a WAN) under the direction of a network administrator, automatically based on a specified configuration, or in response to a request initiated by the client device 106 or in response to the initiation of a web browser on the client device 106. The web extension 1202 can execute a polling function on one or more target network devices or destination endpoints 114 which serve as resources for data or information associated with web domains on the second network 120 (e.g. a WAN).

Figure 13A:
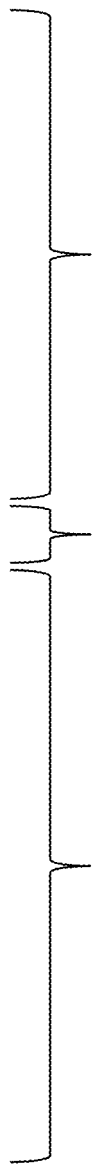
FIGS. 13A and 13B illustrate endpoint request format in accordance with exemplary embodiments.
Figure 13B:
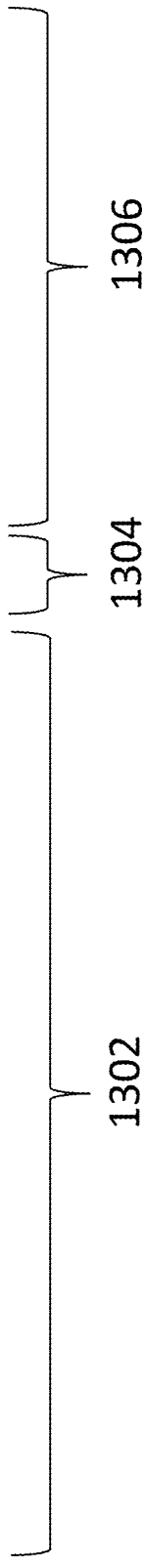

FIGS. 13A and 13B illustrate endpoint request format in accordance with exemplary embodiments. As shown in FIGS. 13A and 13B, the endpoint 114 can include an IP address 1302, port 1304, and URL 1306 specific to the requesting application or resource being requested.

The monitoring device 102 can be configured to enforce the domain name of an endpoint by intercepting DNS lookups and resolving a web request to its own IP address. As a result, web extension 1202 communicates with the monitoring device 102 as if it were communicating with the destination endpoint 114 identified in the web request of the client device 106. The web extension 1202 can periodically make a request to an endpoint 114, as specified, for example in FIGS. 13A and 13B, and receive a payload containing a unique network identifier (e.g., a serial number) for the monitoring device 102 and optionally information which can be used to inform filtering decisions, such as the user's or client device's 106 publicly available IP address. The web extension 1202 can include a corresponding user interface 1210, software application, or process that is executed on the client device 106 of a user or network administrator. The user interface 1210 can allow for a user-defined configuration of the web extension 1202, notification of events associated with the destination endpoints or web page, and/or the status of operation of the web extension 1202. The user interface 1210 can include any combination of a graphical interface, speaker, light emitting means, or other suitable component, means, or device as desired.

Once the endpoint 114 has been detected for the first time, the web extension 1202 sends information to the client device 106, which notifies the user that the client device 106 is connecting or has connected to a new endpoint. The notification can also inform the user that their personal browsing activity could potentially be monitored by the owner of the destination endpoint 114 and is presented with the ability to initiate a cloaking mode, which conceals the user's web browsing data on the client device 106. According to an exemplary embodiment, the cloaking mode can be configured as a default feature, which can be toggled on or off to facilitate debugging. If the cloaking mode is accepted, the web extension 1202 registers the device identifier so that the notification regarding the detection of or connection to the new destination endpoint 114 is not displayed in the future. The web extension 1202 can also register in memory a user's security preferences on the device. According to an exemplary embodiment, if the web extension 1202 is under the control of a network administrator, preferences for a plurality of users on the local network 118 can be registered. Based on the settings or preferences of a specific user, the monitoring device 102 can obfuscate any data collected from the registered web extension 1202 so that it cannot be viewed by other users who may have shared access or use of the client devices 106 on the LAN 118.

To protect the privacy of a user's web browsing activity on the LAN 118 from detection by adversaries, the web extension 1202 can be configured to encrypt any communications between it and the client device 106. Asymmetric public-key cryptography such as is typically used by web browsers is unsuitable for this purpose, as it requires the generation, registration and storage of public and private cryptography keys utilizing public network infrastructure. According to exemplary embodiments of the present disclosure, the monitoring device 102 can periodically generate a symmetric public/private key pair utilizing a previously agreed upon cryptographic methodology, such as the Networking and Cryptography library (NaCl) or other suitable methodology or protocol as desired. The monitoring device 102 can expose a polling endpoint (*/api/poll) to the web extension 1202 through the publication of the public key on the second network 120 (e.g. a WAN). The monitoring device 102 can securely store its private key in resident memory. According to an exemplary embodiment, the private key is not stored in persistent storage (e.g., non-volatile memory), and as a result it cannot be subject unauthorized access or recovery through malicious activity. According to another exemplary embodiment, the monitoring device 102 can be configured to periodically change or update the key pair values for security purposes.

The web extension 1202 can be configured to generate a public/private key pair with the same cryptographic algorithm used by the monitoring device 102. The web extension 1202 can periodically call the polling function to access and retrieve the current public key of the monitoring device 102. For example, the web-extension can call a pre-specified network device or endpoint 114 according to the following:

http://Winston.conf:81/api/poll

The monitoring device 102 can respond to the polling request with its current public cryptographic key. For example, the monitoring device 102 can generate a response as follows:

---

{"PublicKey": [223, 72, 52, 214, 242, 92, 117, 29, 49, 67, 53, 31, 173, 2, 213, 35, 39, 38, 101, 143, 216, 99, 58, 31, 170, 207, 166, 51, 9, 4, 36, 115]}

---

Once the public key is obtained, all subsequent requests the web extension 1202 makes to the endpoint 114 are encrypted using the web extension's private key. The public key retrieved from the monitoring device 102 is sent along with the encrypted payload. The monitoring device 102 decrypts the payload using its own private key and the public key provided by the web extension 1202. Once the monitoring device 102 decrypts the message, it completes the API request and encrypts its response using its own private key and the public key provided by the web extension 1202. The response includes an encrypted payload, which the monitoring device 102 sends to the web extension 1202. The web extension 1202 decrypts the encrypted payload using its public/private key pair.

According to an exemplary embodiment, the web extension 1202 can also make subsequent requests to the monitoring device 102 using asymmetric encryption where the web extension 1202 encrypts the API request using its public key and the current public key of the monitoring device 102. The public key of the endpoint 114 is attached to the payload of the request in plain text. For example, the API request can be encrypted as follows:

```
{"PublicKey": [223, 72, 52, 214, 242, 92, 117, 29, 49, 67, 53, 31, 173, 2, 213, 35, 39, 38, 101, 143, 216, 99, 58, 31, 170, 207, 166, 51, 9, 4, 36, 115],
"msg": [17, 25, 179, 12, 0, 23, 57, 2, 213, 1, 76, 128, 9, 212, 12, 65, 29, 19, 28, 12, 0, 0, 17, . . . ]}
```

The monitoring device 102 decrypts the message received from the web extension 1202 using the public key of the web extension 1202 and its own private key. For example, the decryption can be performed according to the following:
"msg": "host",
"host": "example.org"

The aforementioned functions and operations of the web extension 1202 in communication with the monitoring device 102, enable the web extension to remotely perform web filtering requests which have previously been resolved within the browser. This eliminates memory or other architectural limitations enforced by any specific browser implementation, enabling privacy and ad blocking functionality even within browsers that otherwise prohibit it.

Even within browsers that do not prohibit this, the exemplary embodiments disclosed herein offer significant performance improvements by offloading lookups (and associated memory consumption) to a separate device expressly intended for this purpose. This arrangement reduces RAM and CPU utilization within the client device.

The disclosed functionality is exposed by the monitoring device 102 using a series of API calls which enable the web extension 1202 to look up individual domains on network block/allow lists, set cookie filtering parameters, anti-fingerprinting parameters, perform request filtering, and log requests made by the browser for further analysis by the monitoring device 102.

Detection of a Connected Network Device

Figure 14:
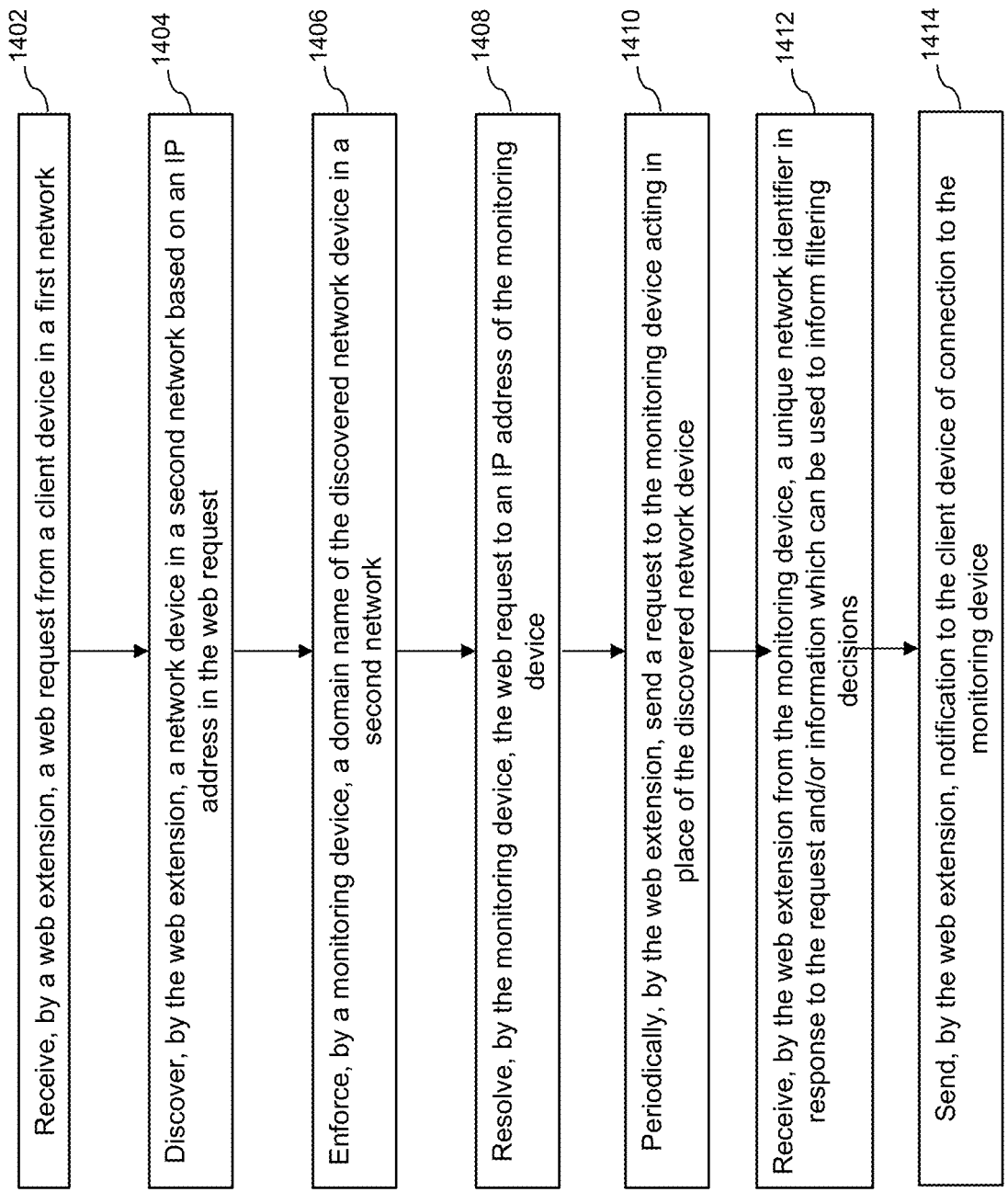
FIG. 14 is a flow chart illustrating a method 1400 for detecting connected networking device in accordance with an exemplary embodiment.

FIG. 14 is a flow chart illustrating a method 1400 for detecting connected networking device in accordance with an exemplary embodiment.

In a step 1402, the web extension 1202 can receive a web request from the web browser 1204 of the client device 106. The web extension 1202 can execute a polling request based on an IP address included in the web request to discover the presence of a connected network device 114 (step 1404). The web request can be formatted according to the examples shown in FIGS. 13A and 13B. The monitoring device 102 can enforces the domain name of an endpoint 114 by intercepting DNS lookups (step 1406), and resolving the web request to its own IP address (step 1408). Once the discovery process is complete, the web extension 1202 can periodically send a request to the monitoring device 102, which acts in place of the discovered endpoint 114 (step 1410). In response, the web extension 1202 can receive, from the monitoring device 102, a payload containing a unique network identifier (e.g., serial number) of the monitoring device 102 and/or information which can be used to inform filtering decisions, such as a user's publicly available IP address (step 1412). In step 1414, the web extension 1202 can send a message to the client device 106 for display on a user interface 1210. The message can notify the user that the client device 106 is connecting or has connected to a new network device.

Exemplary Method for Filtering Domain Requests

Figure 15:
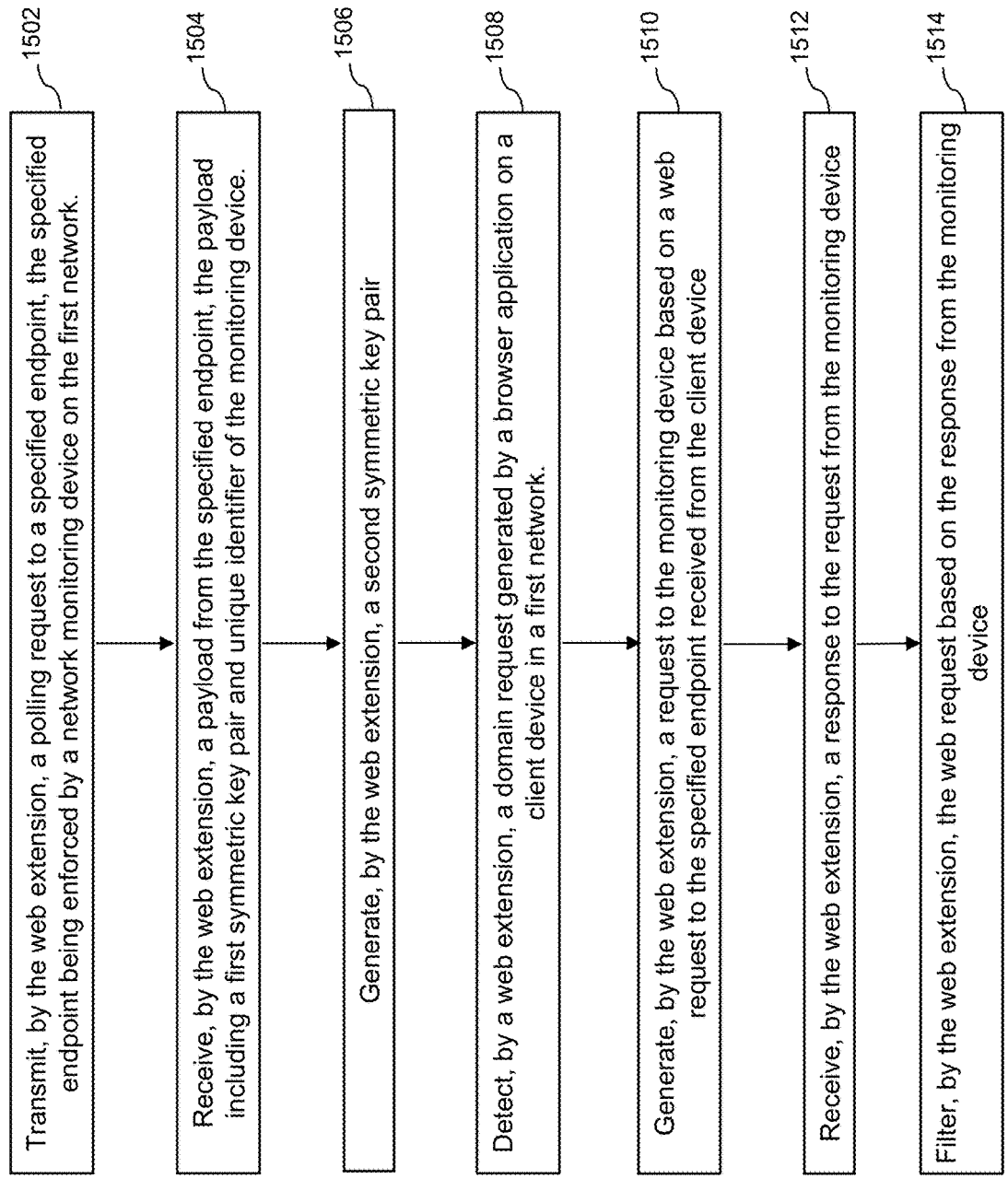
FIG. 15 illustrates a method 1500 for filtering domain requests in accordance with exemplary embodiments.

FIG. 15 illustrates a method 1500 for filtering domain requests in accordance with exemplary embodiments.

The method 1500 can be performed after an endpoint 114 has been discovered according to the method 1400 of FIG. 14. The web extension 1202 sends a polling request to a monitoring device 102, which enforces the destination endpoint 114 identified in the web request (step 1502). In response to the polling request, web extension 1202 receives a symmetric public/private key pair generated by the monitoring device 102 according to an agreed upon cryptographic methodology (step 1504). In a step 1506, the web extension 1202 can generate a symmetric public/private key pair with the same algorithm used by the monitoring device 102. In a step 1508, the web extension 1202 detects a domain request generated by a browser application on a client device in a first network. The web extension 1202 makes request (e.g., an API call) to the monitoring device 102 based on the received domain request (step 1510). The request can be generated for retrieving information, such as the current public key of the monitoring device 102 and/or information which can be used to inform filtering decisions. The request is encrypted using the private key of the web extension 1202. The payload of the request includes the public key. The web extension 1202 receives a response to the API request from the monitoring device 102, the response including the private key of the monitoring device 102 and the public key of the web extension 1202, and information which can be used to inform filtering decisions (step 1512). The web extension filters the web request based on the response from the monitoring device 102 (step 1514).

Performance of methods 1400 and 1500 allow the web extension 1202 to certify the identity of the monitoring device 102. It also ensures that all subsequent requests originating from the web extension 1202 are guaranteed to have originated from that extension and not an adversary. Finally, it prevents anyone who has access to the user's local network (e.g. the first network 118) from learning the contents of the API requests, which could potentially reveal the user's browsing activity.

Computer System Architecture

Figure 16:
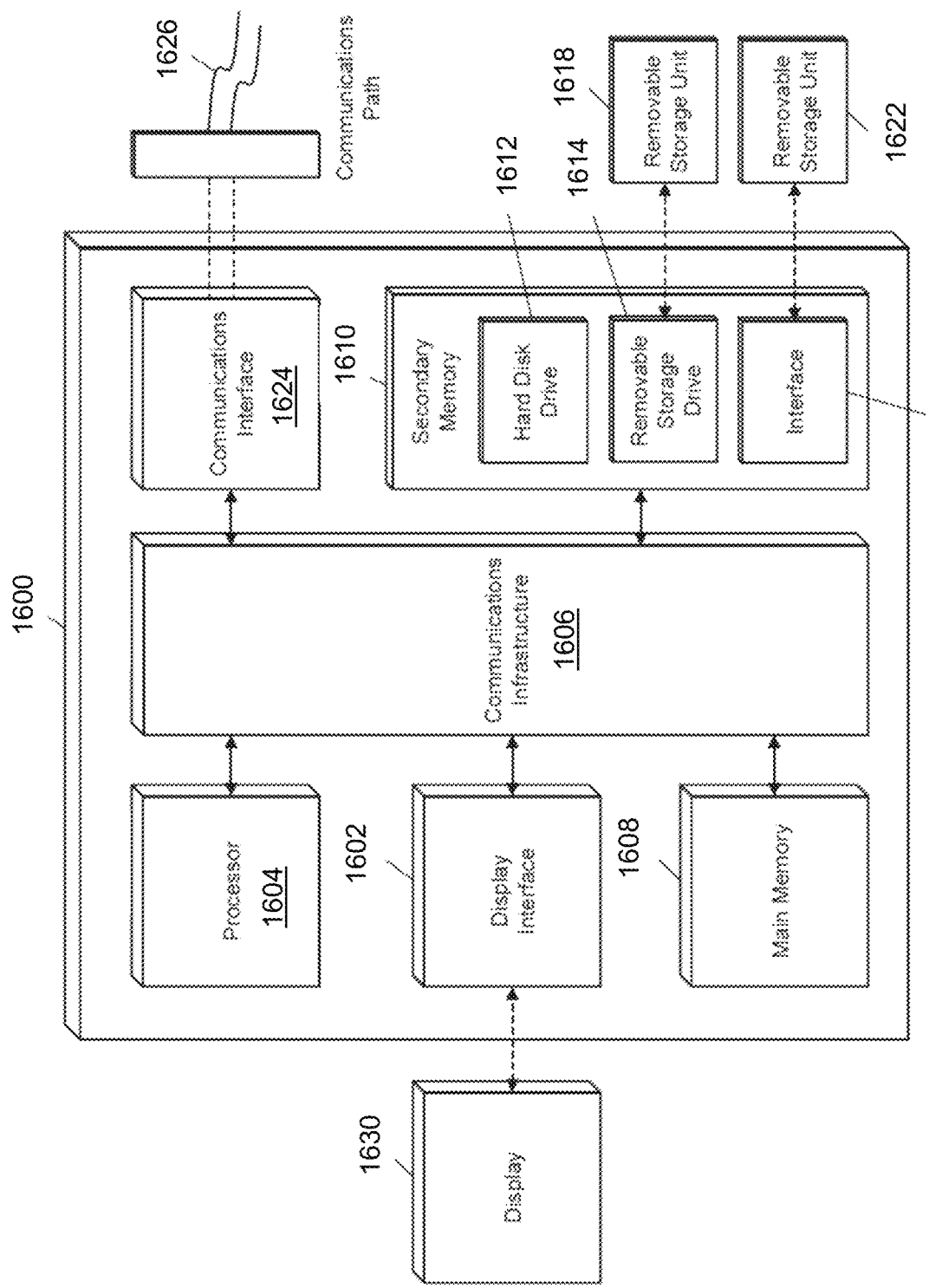
FIG. 16 is a block diagram illustrating computer system architecture in accordance with exemplary embodiments.

FIG. 16 illustrates a computer system 1600 in in accordance with exemplary embodiments. For example, the monitoring device 102, router 104, client devices 106, and computing devices 114 of FIG. 1 may be implemented in the computer system 1600 using hardware, software, firmware, non-transitory computer readable media having instructions stored thereon, or a combination thereof and may be implemented in one or more computer systems or other processing systems. Hardware, software, or any combination thereof may embody modules and components used to implement the methods disclosed herein.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1618, a removable storage unit 1622, and a hard disk installed in hard disk drive 1612.

Various embodiments of the present disclosure are described in terms of this example computer system 1600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1604 may be a special purpose or a general purpose processor device specifically configured to perform the functions discussed herein. The processor device 1604 may be connected to a communications infrastructure 1606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1600 may also include a main memory 1608 (e.g., random access memory, read-only memory, etc.), and may also include a secondary memory 1610. The secondary memory 1610 may include the hard disk drive 1612 and a removable storage drive 1614, such as a floppy disk drive, a magnetic tape drive, an optical disk drive, a flash memory, etc.

The removable storage drive 1614 may read from and/or write to the removable storage unit 1618 in a well-known manner. The removable storage unit 1618 may include a removable storage media that may be read by and written to by the removable storage drive 1614. For example, if the removable storage drive 1614 is a floppy disk drive or universal serial bus port, the removable storage unit 1618 may be a floppy disk or portable flash drive, respectively. In one embodiment, the removable storage unit 1618 may be non-transitory computer readable recording media.

In some embodiments, the secondary memory 1610 may include alternative means for allowing computer programs or other instructions to be loaded into the computer system 1600, for example, the removable storage unit 1622 and an interface 1620. Examples of such means may include a program cartridge and cartridge interface (e.g., as found in video game systems), a removable memory chip (e.g., EEPROM, PROM, etc.) and associated socket, and other removable storage units 1622 and interfaces 1620 as will be apparent to persons having skill in the relevant art.

Data stored in the computer system 1600 (e.g., in the main memory 1608 and/or the secondary memory 1610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1600 may also include a communications interface 1624. The communications interface 1624 may be configured to allow software and data to be transferred between the computer system 1600 and external devices. Exemplary communications interfaces 1624 may include a modem, a network interface (e.g., an Ethernet card), a communications port, a PCMCIA slot and card, etc. Software and data transferred via the communications interface 1624 may be in the form of signals, which may be electronic, electromagnetic, optical, or other signals as will be apparent to persons having skill in the relevant art. The signals may travel via a communications path 1626, which may be configured to carry the signals and may be implemented using wire, cable, fiber optics, a phone line, a cellular phone link, a radio frequency link, etc.

The computer system 1600 may further include a display interface 1602. The display interface 1602 may be configured to allow data to be transferred between the computer system 1600 and external display 1630. Exemplary display interfaces 1602 may include high-definition multimedia interface (HDMI), digital visual interface (DVI), video graphics array (VGA), etc. The display 1630 may be any suitable type of display for displaying data transmitted via the display interface 1602 of the computer system 1600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1608 and secondary memory 1610, which may be memory semiconductors (e.g., DRAMs, etc.). These computer program products may be means for providing software to the computer system 1600. Computer programs (e.g., computer control logic) may be stored in the main memory 1608 and/or the secondary memory 1610. Computer programs may also be received via the communications interface 1624. Such computer programs, when executed, may enable computer system 1600 to implement the present methods as discussed herein. In particular, the computer programs, when executed, may enable processor device 1604 to implement the methods as discussed herein. Accordingly, such computer programs may represent controllers of the computer system 1600. Where the present disclosure is implemented using software, the software may be stored in a computer program product and loaded into the computer system 1600 using the removable storage drive 1614, interface 1620, and hard disk drive 1612, or communications interface 1624.

The processor device 1604 may comprise one or more modules or engines configured to perform the functions of the computer system 1600. Each of the modules or engines may be implemented using hardware and, in some instances, may also utilize software, such as corresponding to program code and/or programs stored in the main memory 1608 or secondary memory 1610. In such instances, program code may be compiled by the processor device 1604 (e.g., by a compiling module or engine) prior to execution by the hardware of the computer system 1600. For example, the program code may be source code written in a programming language that is translated into a lower level language, such as assembly language or machine code, for execution by the processor device 1604 and/or any additional hardware components of the computer system 1600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1600 to perform the functions disclosed herein. It will be apparent to persons having skill in the relevant art that such processes result in the computer system 1600 being a specially configured computer system 1600 uniquely programmed to perform the functions discussed above, for example, with reference to methods 400, 500, 600, 900, 1100, 1400, and 1500.

Techniques consistent with the present disclosure provide, among other features, systems and methods for unique identifying a network client or application based on a transport layer security handshake. While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for rate limiting of JavaScript functions, the method comprising:
    monitoring network traffic between one or more devices on a first network and a second network;
    receiving a domain request from one of the one or more devices;
    receiving a JavaScript function request from the domain of the domain request;
    comparing the JavaScript function request to a ledger, the ledger having a rate limit associated with one or more JavaScript functions for a plurality of domains, the rate limit defining a threshold number of JavaScript functions requests allowed for each of the plurality of domains in a period of time; and
    in response to the domain matching one of the plurality of domains on the ledger:
        compare the domain to the rate limit associated with the matching domain of the plurality of domains on the ledger;
        determine the rate limit associated with the domain for the JavaScript function request has been exceeded;
        log the JavaScript function request in the ledger; and
        block the JavaScript function request.

2. The method according to claim 1, wherein blocking the JavaScript function request includes:
    returning a falsified value to the domain.

3. The method according to claim 1, wherein the ledger is maintained in a memory by a wrapper function.

4. The method according to claim 3, wherein the ledger operates using a ledger logic and wrapper function being deployed on the domain using a JavaScript file.

5. The method according to claim 1, comprising:
    assigning a risk score to the plurality of domains on the ledger, the risk score correlating to a privacy risk associated with each of the plurality of domains.

6. The method according to claim 5, wherein the rate limit for each of the plurality of domains is based on the risk score associated with each of the plurality of domains.

7. The method according to claim 1, comprising:
    storing, in a memory of a computing device, one or more compatibility modules, the one or more compatibility modules being a security policy defining the rate limit for the plurality of domains;
    receiving a user selection of at least one of the one or more compatibility modules, the user selection being received via a graphical user interface; and
    enabling the selected security policy.

8. A method for privacy and security policy delivery, comprising:
    storing, in a memory device of a computing device, activity data associated with a plurality of domains on a first network, wherein the activity data is associated with a cookie of each of the plurality of domains, the activity data defining at least an expiration time of the associated cookie;
    monitoring, by the computing device, a stream of packets addressed to a destination endpoint on the first network, the stream of packets originating from a device on a second network;
    analyzing, by the computing device, the stream of packets to identify a first domain associated with the destination endpoint and a second domain associated with the originating device;
    comparing, by the computing device, the first and second domains with the activity data stored in the memory device;
    determining, by the computing device, a security risk of the first and second domains to a user of the originating device; and
    enforcing, by the computing device, security policies for the first and second domains based on the determined security risks for each domain.

9. The method of claim 8, wherein the memory device includes a first cache and a second cache, the method further comprising:
    storing, in the first cache of the memory device, activity data associated with at least one first domain of the first network; and
    storing, in the second cache of the memory device, activity data associated with at least one second domain associated with the originating device on the second network.

10. The method of claim 8, wherein the computing device monitors the stream of packets on a secure connection established with the originating device via a trusted certificate of the originating device.

11. The method of claim 10, further comprising:
    decrypting the stream of packets based on the trusted root certificate.

12. The method of claim 8, further comprising:
    storing, in the memory device of the computing device, one or more compatibility modules associated with the plurality of domains located on the first network, each compatibility module defining at least one security policy for an associated domain.

13. The method of claim 12, wherein enforcing the security policies of the first and second network, comprises:

accessing, by the computing device, compatibility modules associated with each of the first and second domains based on the determined security risk of each domain.

14. The method of claim 8, wherein if the first domain is matched to a specified domain in the first cache, the method further comprising:

determining that the security risk of the first domain is low; and extending the expiration time of the cookie associated with the specified domain.

15. The method of claim 8, wherein if the second domain is not matched to a specified domain in the second cache, the method further comprising:

determining that the security risk of the second domain is high;

creating an entry for the second domain in the second cache; and setting a counter value associated with the second domain to zero.

* * * * *